US009360279B2

(12) United States Patent
Sjölund

(10) Patent No.: US 9,360,279 B2
(45) Date of Patent: Jun. 7, 2016

(54) DEVICE FOR SIGNATURE ADAPTATION AND OBJECT PROVIDED WITH SUCH A DEVICE

(75) Inventor: Peder Sjölund, Örnsköldsvik (SE)

(73) Assignee: BAE SYSTEMS HÄGGLUNDS AKTIEBOLAG, Örnsköldsvik (SE)

( * ) Notice: Subject to any disclaimer, the term of this patent is extended or adjusted under 35 U.S.C. 154(b) by 254 days.

(21) Appl. No.: 14/122,657

(22) PCT Filed: Jun. 5, 2012

(86) PCT No.: PCT/SE2012/050601
§ 371 (c)(1), (2), (4) Date: Jan. 16, 2014

(87) PCT Pub. No.: WO2012/169958
PCT Pub. Date: Dec. 13, 2012

(65) Prior Publication Data
US 2014/0125506 A1 May 8, 2014

(30) Foreign Application Priority Data
Jun. 7, 2011 (SE) ...................................... 1150517

(51) Int. Cl.
*F41H 3/00* (2006.01)
*H01Q 17/00* (2006.01)
*G01S 13/00* (2006.01)

(52) U.S. Cl.
CPC . *F41H 3/00* (2013.01); *H01Q 17/00* (2013.01)

(58) Field of Classification Search
CPC ............. F41H 3/00; F41H 3/02; H01Q 17/00; H01Q 17/001; H01Q 17/002; H01Q 17/004; H01Q 17/005; H01Q 17/007; H01Q 17/008
USPC ........................................... 342/1-4; 428/919
See application file for complete search history.

(56) References Cited

U.S. PATENT DOCUMENTS 4,327,364 A * 4/1982 Moore .................. H01Q 17/00 342/1
4,560,595 A * 12/1985 Johansson ................ F41H 3/02 428/919

(Continued)

FOREIGN PATENT DOCUMENTS

CN 101625215 A 1/2010
CN 101819007 A 9/2010

(Continued)

OTHER PUBLICATIONS

Office Action received for Chinese Patent Application No. 201280027959.3, mailed on Sep. 16, 2014, 15 pages (8 pages of English Translation and 7 pages of Official Copy).

(Continued)

*Primary Examiner* — Bernarr Gregory
(74) *Attorney, Agent, or Firm* — Morrison & Foerster LLP

(57) ABSTRACT

The invention pertains to a device for signature adaptation, comprising at least one surface element (100; 300; 500) arranged to assume a determined thermal distribution, wherein said surface element comprises at least one temperature generating element (150; 450*a*, 450*b*, 450*c*) arranged to generate at least one predetermined temperature gradient to a portion of said at least one surface element. Said at least one surface element (100; 300; 500) comprises at least one radar suppressing element (190), wherein said at least one radar suppressing element (190) is arranged to suppress reflections of incident radio waves. The invention also concerns an object provided with a device for signature adaptation.

23 Claims, 13 Drawing Sheets

(56) References Cited

U.S. PATENT DOCUMENTS

| | | | | |
|---|---|---|---|---|
| 4,609,034 | A | 9/1986 | Kosson et al. | |
| 4,801,113 | A | 1/1989 | Engelhardt | |
| 4,991,797 | A | 2/1991 | Miller et al. | |
| 5,036,211 | A * | 7/1991 | Scott | F41H 3/00 428/919 |
| 5,077,101 | A | 12/1991 | Conway et al. | |
| 5,080,165 | A | 1/1992 | Engelhardt | |
| 5,307,162 | A | 4/1994 | Schowengerdt | |
| 5,734,495 | A * | 3/1998 | Friedman | F41H 3/00 428/919 |
| 5,751,006 | A | 5/1998 | Cooper | |
| 5,922,986 | A | 7/1999 | Wanninger et al. | |
| 6,128,999 | A | 10/2000 | Sepp et al. | |
| 6,338,292 | B1 | 1/2002 | Reynolds et al. | |
| 6,927,724 | B2 | 8/2005 | Snaper | |
| 6,997,981 | B1 | 2/2006 | Coombs et al. | |
| 7,102,814 | B1 | 9/2006 | Hughes | |
| 7,215,275 | B2 | 5/2007 | Dumas | |
| 7,956,793 | B2 | 6/2011 | Puscasu et al. | |
| 7,999,720 | B2 | 8/2011 | Jung et al. | |
| 8,077,071 | B2 * | 12/2011 | Cincotti | F41H 3/00 342/3 |
| 8,643,532 | B1 | 2/2014 | Puscasu et al. | |
| 8,909,385 | B2 | 12/2014 | Olson et al. | |
| 2002/0117605 | A1 | 8/2002 | Alden | |
| 2004/0036006 | A1 | 2/2004 | Dowling | |
| 2004/0119631 | A1 | 6/2004 | Sanders et al. | |
| 2004/0213982 | A1 | 10/2004 | Touzov | |
| 2005/0045702 | A1 | 3/2005 | Freeman et al. | |
| 2005/0052310 | A1 | 3/2005 | Snaper | |
| 2005/0208321 | A1 | 9/2005 | Riley et al. | |
| 2006/0222827 | A1 | 10/2006 | Marshall et al. | |
| 2007/0035435 | A1 | 2/2007 | Dumas | |
| 2008/0143579 | A1 | 6/2008 | Saccomanno | |
| 2008/0297878 | A1 | 12/2008 | Brown et al. | |
| 2009/0214852 | A1 | 8/2009 | Kelsey et al. | |
| 2009/0263644 | A1 | 10/2009 | Kelsey et al. | |
| 2010/0000231 | A1 | 1/2010 | Meir | |
| 2010/0112316 | A1 | 5/2010 | Cincotti et al. | |
| 2010/0207025 | A1 | 8/2010 | Meir | |
| 2010/0288116 | A1 | 11/2010 | Cincotti et al. | |
| 2011/0095931 | A1 | 4/2011 | Child | |
| 2012/0031452 | A1 | 2/2012 | Sjolund | |
| 2012/0148797 | A1 | 6/2012 | Tsai | |

FOREIGN PATENT DOCUMENTS

| | | | |
|---|---|---|---|
| GB | 2362283 | A | 11/2001 |
| WO | 2010/093323 | A1 | 8/2010 |

OTHER PUBLICATIONS

Office Action received for Chinese Patent Application No. 201280027676.9, mailed on Oct. 11, 2014, 15 pages (7 pages of English Translation and 8 pages of Official Copy).

Extended European Search Report received for European Patent Application No. 12796513.5, mailed on Oct. 2, 2014, 7 pages.

Extended European Search Report received for European Patent Application No. 12797329.5, mailed on Oct. 7, 2014, 8 pages.

International Search Report received for PCT Patent Application No. PCT/SE2012/050601, mailed on Sep. 4, 2012, 6 pages.

Office Action received for Russian Patent Application No. 2013154752/20, mailed on Mar. 3, 2014, 4 pages (1 page of English Translation and 3 pages of Official copy).

Non Final Office Action received for U.S. Appl. No. 14/113,576 mailed on Sep. 23, 2015, 36 pages.

Office Action received for Chinese Patent Application No. 201280027959.3, mailed on May 29, 2015, 7 pages (4 pages of English Translation and 3 pages of official copy).

Office Action Received for Australian Patent Application No. 2012267231, mailed on Jan. 12, 2016, 3 pages.

Office Action received for Australian Patent Application No. 2012267227, mailed on Jan. 19, 2016, 3 pages.

International Search Report received for PCT Patent Application No. PCT/SE2012/050596, mailed on Sep. 4, 2012, 6 pages.

International Preliminary Report on Patentability received for PCT Patent Application No. PCT/SE2012/050596, mailed on Dec. 27, 2013, 10 pages.

International Preliminary Report on Patentability received for PCT Patent Application No. PCT/SE2012/050601, mailed on Dec. 27, 2013, 10 pages.

Written Opinion received for PCT Patent Application No. PCT/SE2012/050596, mailed on Sep. 4, 2012, 8 pages.

Written Opinion received for PCT Patent Application No. PCT/SE2012/050601, mailed on Sep. 4, 2012, 8 pages.

Office Action received for Russian Patent Application No. 2013154752/11, mailed on Dec. 14, 2015, 6 pages (2 pages of English Translation and 4 pages of official copy).

* cited by examiner

DEVICE FOR SIGNATURE ADAPTATION AND OBJECT PROVIDED WITH SUCH A DEVICE

CROSS REFERENCE TO RELATED APPLICATIONS

This application is a U.S. National Phase patent application of PCT/SE2012/050601, filed on Jun. 5, 2012, which claims priority to Swedish Patent Application No. 1150517-9, filed on Jun. 7, 2011, each of which is hereby incorporated by reference in the present disclosure in its entirety.

TECHNICAL FIELD

The present invention pertains to a device for signature adaptation. The present invention also pertains to an object such as a vehicle.

BACKGROUND

Military vehicles/crafts are subjected to threats, e.g. in a situation of war, constituting targets for attack from land, air and sea. It is therefore desired that the vehicle is as difficult as possible to detect and identify. For this purpose military vehicles are often camouflaged to the background such that they are difficult to detect and identify with the bare eye. Further, they are hard to detect in darkness with different types of image intensifiers. A problem is that attacking crafts such as combat vehicles and aircrafts often are equipped with a combination of one or more active and/or passive sensor systems comprising radar and electro-optic/infrared (EO/IR) sensors wherein the vehicles/crafts become relatively easy targets to detect, classify and identify. Users of such sensor systems search for a certain type of thermal/reflecting contour normally not occurring in nature, usually different edge geometries, and/or large evenly heated surfaces and/or even reflecting surfaces.

In order to protect against such systems different types of techniques are at present used in the area of signature adaptation. Signature adaptation techniques comprises constructional actions and are often combined with advanced material techniques in order to provide a specific emitting and/or reflecting surface of the vehicles/crafts in all wave length areas wherein such sensor systems operate.

US2010/0112316 A1 describe a visual camouflage system that provides at least thermal suppression or radar suppression. The system comprises a vinyl layer having a camouflage pattern on a front surface of the vinyl layer. The camouflage pattern comprises a location specific camouflage pattern. A laminate layer is attached over the front surface of the vinyl layer to provide a protection over the camouflage pattern and a reinforcement of the vinyl layer. One or more nano material is applied to at least one of the vinyl layer, the camouflage pattern or the laminate to provide at least one of a thermal or radar suppression. This solution only enables static signature adaptation.

WO/2010/093323 A1 describe a device for thermal adaptation, comprising at least one surface element arranged to assume a determined thermal distribution, said surface element comprising a first heat conducting layer, a second heat conducting layer, said first and second heat conducting layers being mutually thermally isolated by means of an intermediate insulation layer, wherein at least one thermoelectric element is arranged to generate a predetermined temperature gradient to a portion of said first layer. The invention also relates to an object such as a craft. This solution only enables thermal signature adaptation.

OBJECTIVE OF THE INVENTION

An object of the present invention is to provide a device for signature adaptation that handles both radar and thermal signature adaptation.

An additional object of the present invention is to provide a device for thermal and radar signature adaptation which facilitates thermal and radar camouflage with desired thermal and radar cross section (RCS).

An additional object of the present invention is to provide a device for thermal and radar camouflage which facilitates automatic thermal adaptation of surrounding and passive radar adaptation of surrounding and which facilitates providing a un-even thermal structure.

Another object of the present invention is to provide a device for thermally and in terms of radar imitating e.g. other vehicles/crafts in order to provide thermal and radar identification of own troops or to facilitate thermal and radar infiltration in or around e.g. enemy troops during suitable circumstances.

SUMMARY OF THE INVENTION

These and other objects, apparent from the following description, are achieved by a device, a method for signature adaptation and an object, which is of the type stated by way of introduction and which in addition exhibits the features recited in the claims. Preferred embodiments of the inventive device are defined in appended dependent claims.

According to the invention the objects are achieved by a device for signature-adaptation, comprising at least one surface element arranged to assume a determined thermal distribution, said surface element comprising at least one temperature generating element arranged to generate a predetermined temperature gradient to a portion of said at least one surface element, wherein said at least one surface element further comprises at least one radar suppressing element, wherein said at least one radar suppressing element is arranged to suppress reflections of incident radio waves.

Hereby is facilitated an efficient thermal adaptation and radar suppression. A certain application of the present invention is thermal and radar signature adaptation for camouflaging of e.g. military vehicles, wherein said at least one temperature generating element facilitates efficient thermal adaptation and wherein said at least one radar suppressing element facilitates adaptation of radar signature, so that dynamic thermal signature adaptation with maintained low observability within the radar area may be kept during motion of the vehicle.

According to an embodiment of the device said at least one temperature generating element is thermally arranged to a subsurface area of said portion of said at least one surface element for generation of said at least one temperature gradient to said portion.

According to an embodiment of the device said portion constitutes at least one outer layer of said at least one surface element.

According to an embodiment of the device wherein said at least one outer layer is arranged to provide a frequency selective s subsurface area, wherein said frequency selective subsurface area is arranged to pass through radio waves within a predetermined frequency range and wherein said frequency selective subsurface area have heat conducting properties. By providing an outer layer that is frequency selective and that has heat conducting properties it is facilitated to quickly reach a desired temperature of said at least one outer layer and further that incident radio waves within a frequency range typically associated to radar systems is transmitted through said outer layer in order to subsequently be absorbed by said at least one radar suppressing element. Further is facilitated to provide an outer layer that is robust and durable such as for example a metallic outer layer.

According to an embodiment of the device said frequency selective subsurface is arranged to surround said subsurface area of said portion.

According to an embodiment of the device said frequency selective subsurface and said subsurface area to which said at least one temperature generating element is thermally applied, are mutually arranged so that the permeability for radio waves substantially do not impair the heat conductibility of said portion.

According to an embodiment of the device said at least one surface element comprises at least one display surface having thermal permeability and arranged to radiate at least one predetermined spectrum. Hereby is facilitated also visual signature adaptation apart from radar signature adaptation and thermal signature adaptation. Thereby is facilitated also radar, thermal and visual adaptation for camouflage of e.g. military vehicles, wherein the combination of said radar suppressing element said at least one display surface and said at least one temperature generating element facilitates efficient dynamic adaptation of visual signature (colour, pattern) and thermal signature with maintained low radar cross section occurring for stationary vehicles and during motion of the vehicle. By providing a display surface having a thermal permeability, within which said predetermined temperature gradient falls, is further facilitated a de-coupled solution that allows to individually adapt thermal and visual signature independently of each other.

According to an embodiment of the device said at least one display surface is arranged to permit said at least one predetermined temperature gradient to be maintained of said at least one surface element. Hereby is facilitated efficient thermal signature adaptation together with visual signature adaptation without affecting each other.

According to an embodiment of the device said at least one display surface is of emitting type. This provide a cost efficient device.

According to an embodiment of the device said at least one display surface is of reflecting type. Using a display surface of reflecting type facilitates reproducing a more lifelike image of the surrounding environment since display surfaces of reflective type uses natural incident light to radiate said at least one spectrum instead of using one or more active light sources in order to radiate said at least one spectrum.

According to an embodiment of the device said at least one display surface is arranged to radiate at least one predetermined spectrum comprising at least one component within the visual area and at least one component within the infrared area. By radiating one or more spectrum comprising components falling within the infrared area and one or more components falling within the visual area it is facilitated using the components falling within the infrared area to control also the thermal signature apart from the visual signature. This means that thermal signature adaptation can be achieved quicker as compared to only using the temperature generating element.

According to an embodiment of the device said at least one display surface is arranged to radiate at least one predetermined spectrum in a plurality of directions, wherein said at least one predetermined spectrum is directionally dependent. By radiating at least one predetermined spectrum in a plurality of directions it is facilitated to correctly re-creating perspectives of visual background objects by reproducing different spectrums (pattern, colour) in different direction whereby a viewer independently of relative position views a correct perspective of said visual background object. According to an embodiment of the device said at least one display surface comprises a plurality of display subsurfaces, wherein said display subsurfaces are arranged to radiate at least one predetermined spectrum in at least one predetermined direction, wherein said at least one predetermined direction for each display subsurface is individually displaced relative an orthogonal axis of said display surface. By providing a plurality of display subsurfaces it is facilitated to reproduce a plurality of directionally dependent spectrums using a single display surface since each display subsurface is individually controllable.

According to an embodiment of the device said at least one display surface comprises an obstructing layer arranged to obstruct incident light and a underlying curved reflecting layer arranged to reflect incident light. By providing an obstructing layer it is facilitated to reproduce a plurality of directionally dependent spectrums using a single display surface in a cost efficient fashion. As an example said obstructing layer may be formed by thin film.

Furthermore it is facilitated that spectrums adapted to be reproduced in a certain angle or angular range are not visible in viewing angles falling outside of said certain angle of angular range, as a result of using said obstructing layer.

According to an embodiment of the device said the device comprises at least one additional element arranged to provide armour. By providing at least one additional element arranged to provide armour it is facilitated apart from increasing the robustness to provide a device forming a modular armour system wherein individual forfeited surface elements of crafts easily can and cost efficiently can be replaced.

According to an embodiment the device further comprises at least one framework or support structure, wherein said at least one framework or support structure is arranged to supply current and control signals/communication. As a result of the framework per se being arranged to deliver current, the number of cables may be reduced.

According to an embodiment the device comprises a first heat conducting layer, a second heat conducting layer, said first and second heat conducting layer being mutually thermally isolated by means of an intermediate insulation layer, wherein at least one thermoelectric element is arranged to generate a predetermined temperature gradient to a portion of said first layer and wherein said first layer and said second layer have anisotropic heat conduction such that heat conduction mainly occurs in the main direction of propagation of the respective layer. By means of the anisotropic layers a quick and efficient transport of heat is facilitated and consequently quick and efficient adaptation. By increasing ratio between heat conduction in the main direction of propagation of the layer and heat conduction crosswise to the layer it is facilitated to arrange the thermoelectric elements at a larger distance from each other in a device with e.g. several interconnected surface elements, which results in a cost efficient composition of surface elements. By increasing the ratio between the heat conductibility along the layer and the heat conductibility crosswise to the layer the layers may be made thinner and still achieve the same efficiency, alternatively make the layer and thus the surface element quicker. If the layers become thinner with retained efficiency, they also become cheaper and lighter. Furthermore it is facilitated a more even distribution of heat in layers arranged directly underneath the display surface which heavily reduces the possibility that potential hot-spots of underlying layers affects the ability of said display surface to correctly reproduce spectrums.

According to an embodiment of the device further comprises an intermediate heat conducting element arranged in the insulation layer between the thermoelectric element and the second heat conducting layer, and has anisotropic heat conduction such that heat conduction mainly occurs crosswise to the main direction of propagation of the second heat conducting layer.

According to an embodiment of the device the surface element has a hexagonal shape. This facilitates simple and general adaptation and assembly during composition of surface elements to a module system. Further an even temperature may be generated on the entire hexagonal surface, wherein local temperature differences which may occur in corners of e.g. a squarely shaped module element are avoided.

According to an embodiment the device further comprises a visual sensing means arranged to sense the surrounding visual background e.g. visual structure. This provides information for adaptation of radiated at least one spectrum from said at least one display surface of surface elements. A visual sensing means such as a video camera provides an almost perfect adaptation of the background, wherein the visual structure of a background (colour, pattern) may be reproduced representable on e.g. a vehicle arranged with several interconnected surface elements.

According to an embodiment of the device said device further comprises thermal sensing means arranged to sense surrounding temperature, such as for example thermal background. This provides information for adaptation surface temperature of surface elements. A thermal sensing means such as an IR-camera provides an almost perfect adaptation of the thermal structure of the background, temperature variations may be reproduced representable on e.g. a vehicle arranged with several interconnected surface elements. The resolution of the IR-camera may be arranged to correspond to the resolution being representable by the interconnected surface elements, i.e. that each surface element corresponds to a number of grouped camera pixels. Hereby a very good representation of the background temperature is achieved such that e.g. heating of the sun, spots of snow, pools of water, different properties of emission etc. of the background often having another temperature than the air may be represented correctly. This efficiently counteracts that clear contours and evenly heated surfaces are created such that when the device is arranged on a vehicle a very good thermal camouflaging of the vehicle is facilitated.

According to an embodiment of the device the surface element has a thickness in the range of 5-60 mm, preferably 10-25 mm. This facilitates a light and efficient device.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 12*a* schematically illustrates a plan view of a module system comprising elements for recreating thermal background or similar;

DETAILED DESCRIPTION OF THE INVENTION

Herein the term "link" is referred to as a communication link which may be a physical line, such as an opto-electronic communication line, or a non-physical line, such as a wireless connection, e.g. a radio link or microwave link.

By radio waves in the electromagnetic spectrum in the embodiments according to the present invention described below is intended radio waves typically used by radar systems. Radio waves may also refer to pulses of radio waves or micro waves as above.

By temperature generating element in the embodiments according to the present invention described below is intended an element by means of which a temperature may be generated.

By thermoelectric element in the embodiments according to the present invention described below is intended an element by means of which Peltier effect is provided when voltage/current is applied thereon.

The terms temperature generating element and thermoelectric element are used interchangeably in the embodiments according to the present invention to describe an element by means of which a temperature may be generated. Said thermoelectric element is intended to refer to an exemplary temperature generating element.

By spectrum in the embodiments according to the present invention described below is intended one or more frequencies or wavelengths of radiation produced by one or more light sources. Thus, the term spectrum is intended to refer to frequencies or wavelengths not only in the visual area both also within the infrared, ultra-violet or other areas of the total electromagnetic spectrum. Further a given spectrum may be of a narrow-band or wide-band type e.g. comprises a relatively small number of frequency/wavelength components or comprises a relatively large number of frequency/wavelength components. A given spectrum may also be the result of a mix of a plurality of different spectrums i.e. comprises a plurality of spectrum radiated from a plurality of light sources.

By colour in the embodiments according to the present invention described below is intended a property of radiated light in terms of how an observer perceive the radiated light. Thus, different colours implicitly refer to different spectrums comprising different frequency/wavelength components.

Figure 1A:
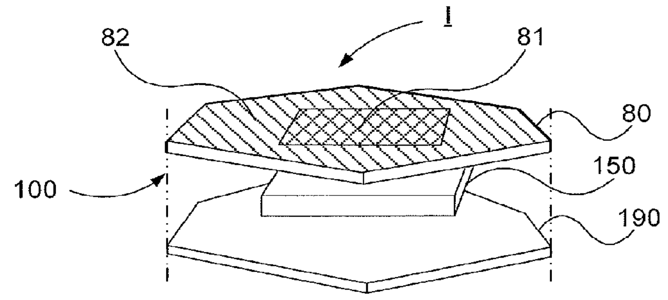
FIG. 1*a* schematically illustrates an exploded three dimensional view of different layers of a part of the device according to an embodiment of the present invention.

FIG. 1*a* schematically illustrates an exploded three dimensional view of a part I of a device for signature adaptation according to an embodiment of the present invention.

Figure 1B:
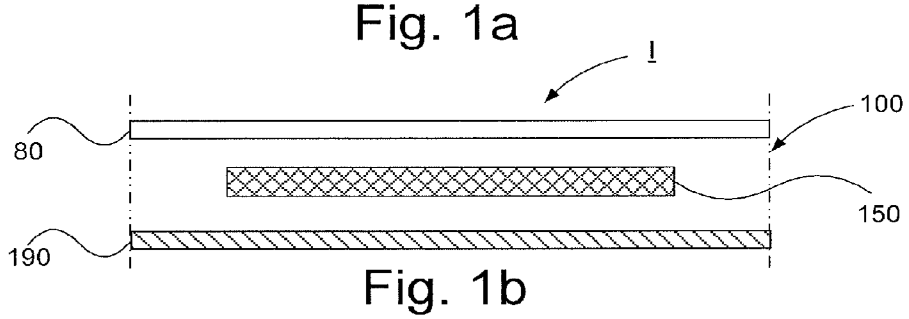
FIG. 1*b* schematically illustrates an exploded side view of different layers of a part of the device in FIG. 1*a;*

FIG. 1*b* schematically illustrates an exploded side view of the part I of the device for signature adaptation according to an embodiment of the present invention.

Surface element 100 comprises at least one temperature generating element 150 arranged to generate at least one predetermined temperature gradient. Said at least one temperature generating element 150 is arranged to generate said predetermined temperature gradient to a portion of said surface element 100. The surface element further comprises a underlying radar suppressing element 190 arranged to absorb incident radio waves and consequently suppress reflection of incident radio waves such as radio waves generating from a radar system. Said radar suppressing element is constituted by one or more layers, each comprising one or more radar absorbing material (RAM) or surface layer such as described with reference to FIG. 8*a*.

Figure 8A:
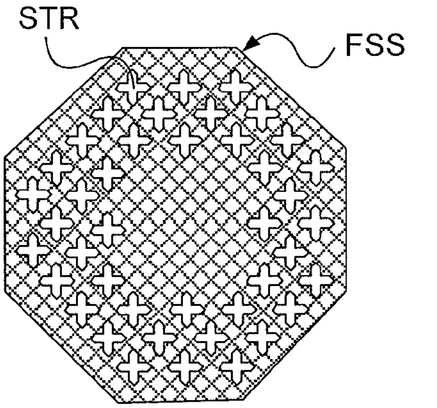
FIG. 8*a* schematically illustrates a plan view of different layers of a part of the device according to an embodiment of the present invention.
Figure 8B:
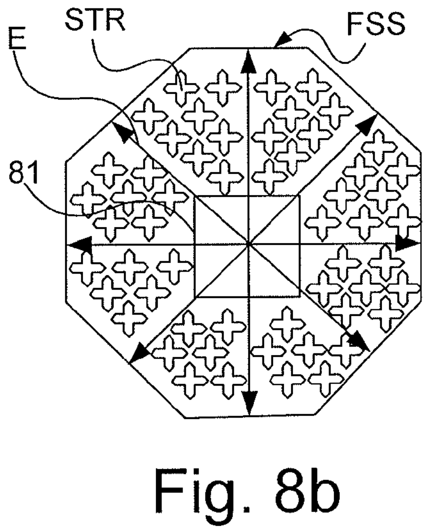
FIG. 8*b* schematically illustrates a plan view of flows of different layers of a part of the device according to an embodiment of the present invention.

According to an embodiment said surface element comprises at least one outer layer 80 arranged to be thermally conducting and frequency selective such as exemplified with reference to FIG. 8*a-b*. According to this embodiment said outer layer 80 is arranged to be frequency selective so that incident radio waves are filtered out and passed through said frequency selective outer layer 80. This provides that filtered incident radio waves are absorbed by said underlying radar suppressive element 190. According to this embodiment said at least one temperature generating element 150 is arranged on a first subsurface 81 on the underside of said at least one outer layer 80. According to this embodiment said at least one outer layer 80 is arranged to provide an outer frequency selective subsurface 80 that substantially surround said first sub surface 81. By providing an application surface to which said at least one temperature generating element 150 rests that is free of frequency selective subsurface is facilitated a more efficient and quicker heat conduction of said at least one outer layer 80.

According to an embodiment said surface element 100 further comprises a display surface, such as exemplified with reference to FIG. 6*a* or 7*a-e*, arranged to radiate at least one predetermined spectrum. The display surface is arranged on said surface element so that said at least one predetermined spectrum is radiated in a direction facing a viewer. The display surface is arranged to have thermal permeability i.e. arranged to pass through said temperature gradient from said temperature generating element 150 without substantially affecting said predetermined temperature gradient.

Figure 2:
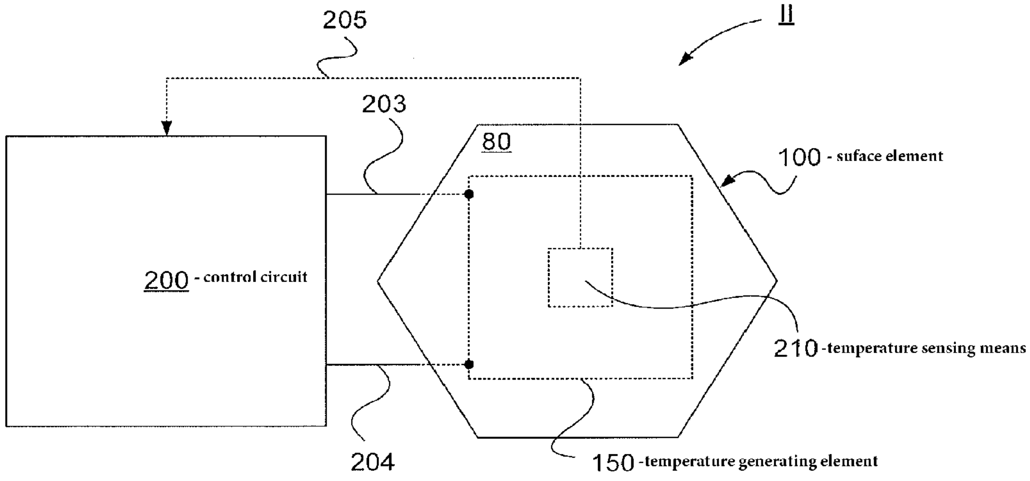
FIG. 2 schematically illustrates a device for signature adaptation according to an embodiment of the present invention.

FIG. 2 schematically illustrates a device II for signature adaptation according to an embodiment of the present invention.

The device comprises a control circuit 200 or control unit 200 arranged on a surface element 100, such as exemplified with reference to FIG. 1, wherein the control circuit 200 is connected to the surface element 100. The surface element 100 comprises at least one temperature generating element 150 such as for example a thermoelectric element. Said thermoelectric element 150 is arranged to receive voltage/current from the control circuit 200, the thermoelectric element 150 according to above being configured in such a way that when a voltage is connected, heat from one side of the thermoelectric element 150 transcends to the other side of the thermoelectric element 150.

The control circuit 200 is connected to the thermoelectric element via links 203, 204 for electric connection of the thermoelectric element 150.

In the cases wherein the surface element comprises at least one display surface, said at least one display surface is according to an embodiment arranged to receive voltage/current from the control circuit 200, according to above being configured in such a way that when a voltage is connected, radiate at least one spectrum from one side of the display surface. According to this embodiment the control circuit 200 is connected to the display surface via links for electric connection of the display surface.

According to an embodiment the device comprises a temperature sensing means 210, dashed line in FIG. 2, arranged to sense the current physical temperature of the surface element 100. The temperature is according to a variant arranged to be compared to temperature information, preferably continuous temperature, from a thermal sensing means of the control circuit 200. Hereby, the temperature sensing means is connected to the control circuit 200 via a link 205. The control circuit is arranged to receive a signal via the link representing temperature data, whereby the control circuit is arranged to compare temperature data to temperature data from the thermal sensing means.

The temperature sensing means 210 is arranged on or in connection to the outer surface of the thermoelectric element 150 such that the sensed temperature is the surface temperature of the surface element 100. When the sensed temperature using the temperature sensing means 210 in comparison to temperature information from the thermal sensing means of the control circuit 200 deviates the voltage provided to the thermoelectric element 150 is according to an embodiment arranged to be controlled such that actual- and reference values match, whereby the surface temperature of the surface element 100 by means of the thermoelectric element 150 is adapted accordingly.

Figure 11:
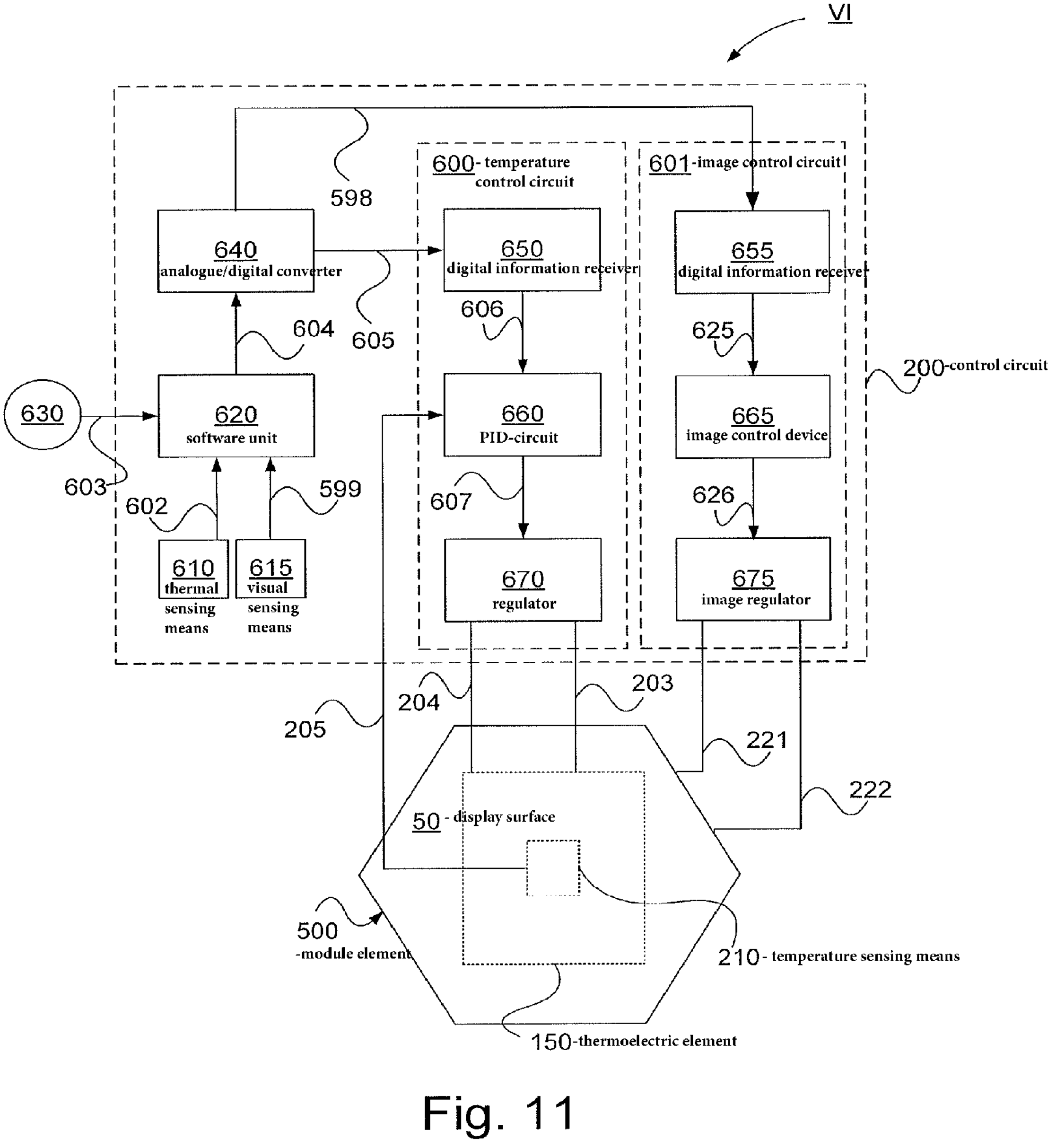
FIG. 11 schematically illustrates a device for signature adaptation according to an embodiment of the present invention.

The design of the control circuit 200 depends on application. According to a variant the control circuit 200 comprises a switch, wherein in such a case voltage over the thermoelectric element 150 is arranged to be switched on or off for providing of cooling (or heating) of the surface of the surface element. FIG. 11 shows the control circuit according to an embodiment of the invention, the device according to the invention being intended to be used for signature adaptation relating to thermal and visual camouflage of e.g. a vehicle.

Figure 3A:
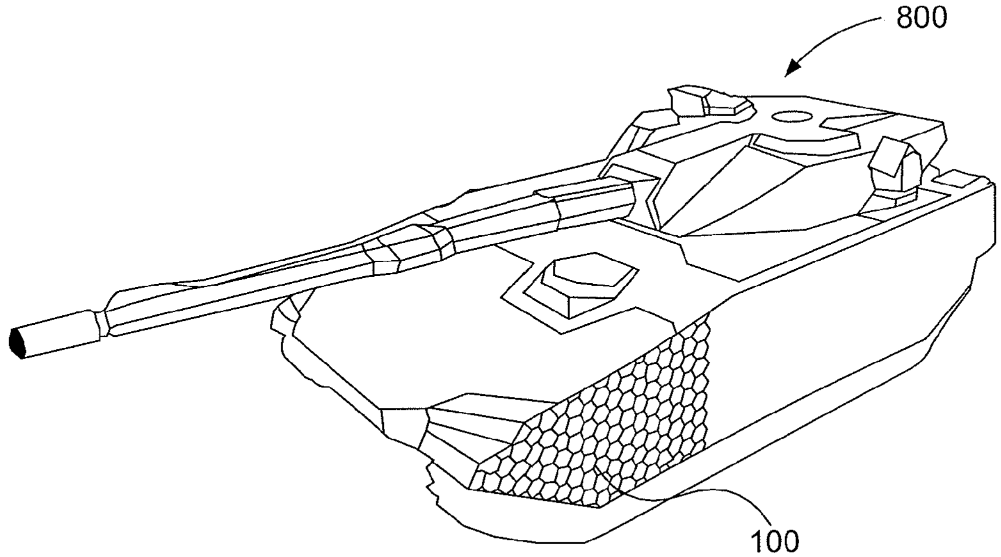
FIG. 3*a* schematically illustrates the device for signature adaptation arranged on an object such as a vehicle, according to an embodiment of the present invention.

FIG. 3*a* schematically illustrates a three dimensional view of a number of surface elements arranged on a platform according to an embodiment of the present invention.

With reference to FIG. 3*a* it is shown an exploded side view of a platform 800. The platform is provided with a number of said surface elements, such as exemplified with reference to FIG. 1, externally arranged on a portion of the platform 800. Said surface element may be arranged in several different configurations that differ from the surface elements as exemplified with reference to FIG. 3*a*. As an example more or fewer surface element may be part of the configuration and these surface elements may be arranged on more and/or larger portions of the platform. The exemplified platform 800 is a military vehicle, such as a motorized combat vehicle. According to this example the platform is a tank or combat vehicle. According to a preferred embodiment the vehicle 800 is a military craft. The platform 800 may be a wheeled vehicle, such as for example a four wheeled, six wheeled or eight wheeled motor vehicle. The platform 800 may be a tracked vehicle, such as for example a tank. The platform 800 may be a terrain vehicle of arbitrary type.

According to an alternative embodiment the platform 800 is a stationary military unit. Herein the platform 800 is described as a tank or combat vehicle, it should however be pointed out that is possible to realize and implement in a naval vessel, such as for example in a surface combat ship. According to one embodiment the vehicle is a ship such as a combat ship. According to an alternative embodiment the platform is an airborne vehicle such as for example an helicopter. According to an alternative embodiment the platform is a civilian vehicle or other unit according to any of the above described types.

Figure 3B:
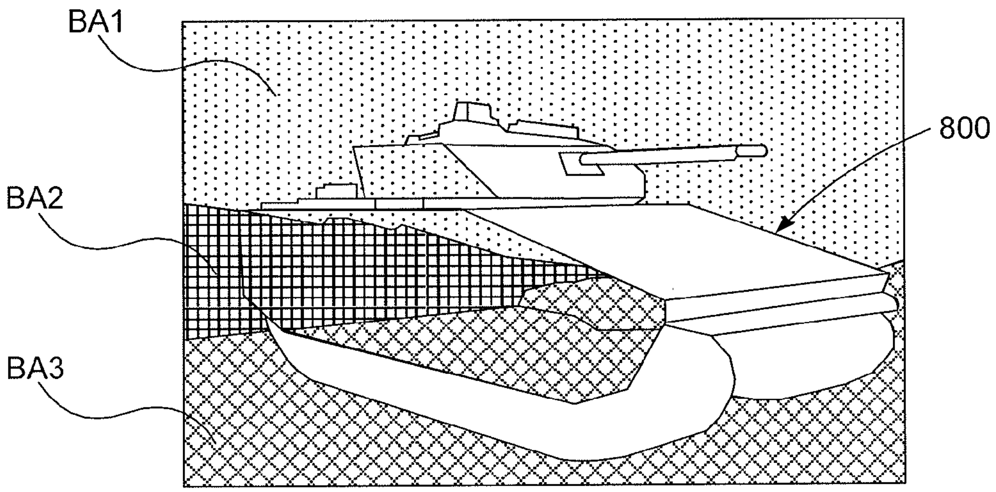
FIG. 3*b* schematically illustrates an object such as a vehicle where the thermal and/or visual structure of the background using the device according to the present invention is reproduced on two parts of the vehicle.

FIG. 3*b* schematically illustrates a three dimensional view of functions of a number of surface elements arranged on a platform according to an embodiment of the present invention.

With reference to FIG. 3*b* it is shown an exploded side view of a platform 800. The platform is provided with a number of said surface elements 100, such as exemplified with reference to FIG. 1*a*, arranged externally on two portions of the platform 800 such as a side of a body and a turret of a motorized combat vehicle 800. Said surface elements may be arranged, in different configurations differing as compared to the configuration of the exemplified surface element with reference to FIG. 3*b*. As an example more or fewer surface elements may be part of the configuration and these surface elements may be arranged on more and/or larger portions of the platform. The vehicle 800 is located in a surrounding that in a perspective of an observer comprises three background structure BA1-BA3 such as a sky BA1, a mountain BA2, and a ground-level plan BA3. Said surface elements is arranged to reproduce said background structures (visually/thermally) BA1-BA3 by means of utilizing the display surface 50 and/or the temperature generating element 150 such as described with reference to FIG. 1*a*.

Figure 4A:
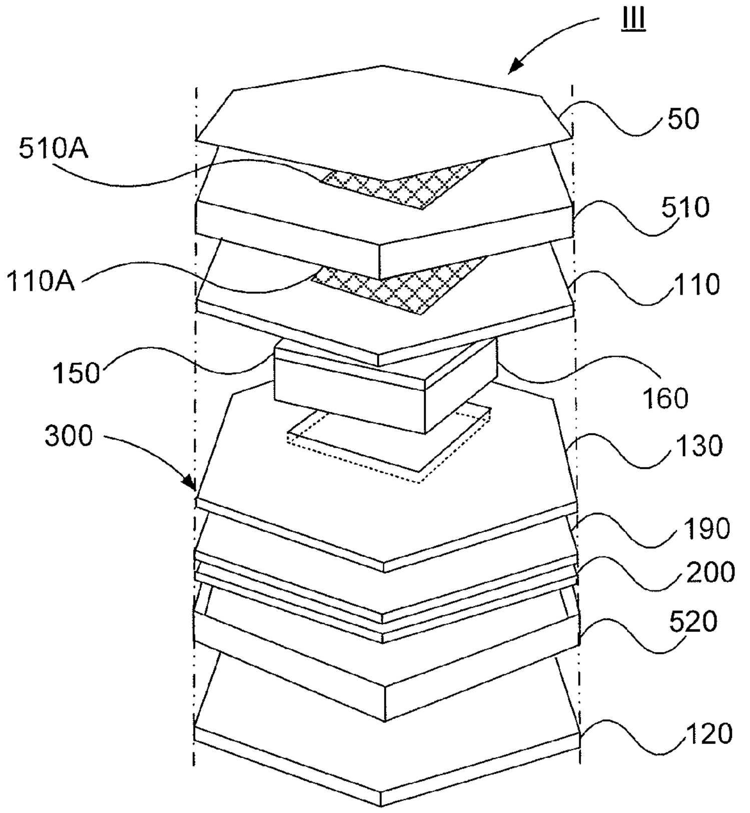
FIG. 4*a* schematically illustrates an exploded three dimensional view of different layers of a part of the device according to an embodiment of the present invention.

FIG. 4*a* schematically illustrates an exploded three dimensional view of a part II of a part of the device for signature adaptation according to an embodiment of the present invention.

The device comprises a surface element 300 comprising a control circuit 200, a housing 510, 520, a first and a second heat conducting layer, an intermediate heat conducting element 160, a radar suppressing element 190 and a display surface 50 arranged to radiate at least one predetermined spectrum. The surface element 300 further comprises at least one temperature generating element 150 arranged to generate at least one predetermined temperature gradient. The temperature generating element 150, such as formed by a thermoelectric element 150, is arranged to generate said predetermined temperature gradient to a portion of said first heat conducting layer 110. The display surface 50 is arranged on said surface element 300 so that said at least one predetermined spectrum is radiated in a direction facing an observer.

According to one embodiment the display surface 50 such as for as described with reference to FIG. 7*a-e* is connected to a first housing element 510 of the surface element 300 using a fastening means such as glue, screw or other type of suitable fastening means.

The control circuit 200, such as exemplified with reference to FIG. 2, is arranged to be electrically/communicatively connected to at least one of the display surface 50 and the temperature generating element 150, wherein the control circuit 200 is arranged to provide control signal relating to said at least one predetermined spectrum and said at least one predetermined temperature gradient. The surface element 300 according to this embodiment comprises a housing, wherein said housing comprises a first housing element 510 and a second housing element 520. The first housing element is arranged as an upper protective housing. The second housing element 520 is arranged as a base plate and is arranged to be applied using fastening means to one or more structures and/or elements of a platform or an object that is desired to be hidden by means of the visual and thermal adaptation enabled by the system. The first and the second housing elements together form a substantially impermeable casing of the first heat conducting layer 110, the intermediate insulation layer 130, the control circuit 200 and the thermoelectric element 150.

The first heat conducting layer 110, which according to a preferred embodiment is constituted by graphite, is arranged underneath the first housing element 510. The second heat conducting layer 120 or inner heat conducting layer 120 is according to a preferred embodiment constituted by graphite.

The first housing element 510 and the first heat conducting element 110 are arranged with a frequency selective surface structure, also referred to as a frequency selective subsurface area 5108, 1108. Said frequency selective subsurface area 5108, 1108 is arranged to surround a subsurface area 510A, 110A of said first housing element 510 and the first heat conducting element 110. Said subsurface area 510A, 110A is further arranged to be free of frequency selective surface structure.

According to an embodiment said subsurface area 510A, 110A of said first housing element 510 and the first heat conducting element 110 is arranged on a surface opposite to the surface to which said at least one thermoelectric element 150 is arranged. The extension of said subsurface area 510A, 110A corresponds to the extension of said at least one thermoelectric element 150.

By providing a frequency selective subsurface area transmission of incident radio waves from radar system is enabled i.e. wherein said radio waves are transmitted/filtered through said first housing element 510 and said first heat conducting element 110.

The first heat conducting layer 110 and the second heat conducting layer 120 have anisotropic heat conductibility such that the heat conductibility in the main direction of propagation, i.e. along the layer 110, 120, is considerably higher than the heat conductibility crosswise to the layer 110, 120. Hereby heat or cold may be dispersed quickly on a large surface with relatively few thermoelectric elements, wherein temperature gradients and hot spots are reduced. The first heat conducting layer 110 and the second heat conducting layer 120 are according to an embodiment constituted by graphite.

One of the first heat conducting layer 110 and the second heat conducting layer 120 is arranged to be a cold layer and another one of the first heat conducting layer 110 and the second heat conducting layer 120 is arranged to be a hot layer.

The insulation layer 130 is configured such that heat from the hot heat conducting layer does not affect the cold heat conducting layer and vice versa. According to a preferred embodiment the insulation layer 130 a vacuum based layer. Thereby both radiant heat and convection heat is reduced.

The thermoelectric element 150 is according to an embodiment arranged in the insulation layer 130. The thermoelectric element 150 is configured in such a way that when a voltage is applied, i.e. a current is supplied to the thermoelectric element 150, heat from one side of the thermoelectric element 150 transcends to the other side of the thermoelectric element 150. The thermoelectric element 150 is consequently arranged between two heat conducting layers 110, 120, e.g. two graphite layers, with asymmetric heat conductibility in order to efficiently disperse and evenly distribute heat or cold. Due to the combination of the two heat conducting layers 110, 120 with anisotropic heat conductibility and the insulation layer 130 the surface of the surface element 100, which according to this embodiment is constituted by the surface of the first heat conducting layer 110, may by application of voltage on the thermoelectric element a surface 102 of the surface element 100 be quickly and efficiently adapted. The thermoelectric element 150 is in thermal contact with the first heat conducting layer 110.

According to an embodiment said intermediate insulation layer 130 is constituted by a material that enables transmission of incident radio waves from a radar system.

According to an embodiment the device comprises an intermediate heat conducting element 160 arranged in the insulation layer 130, the control circuit 200 and the second housing element 520 inside of the thermoelectric element 150 for filling the space between the thermoelectric element 150 and the second heat conducting element 120. This in order to facilitate more efficient heat conduction between the thermoelectric element 150 and the second heat conducting element 120. The intermediate heat conducting layer has anisotropic heat conductibility where the heat conduction is considerably better crosswise to the element than along the element, i.e. it is conducting heat considerably better crosswise to the layers of the surface element 100. This is apparent from FIG. 4*b*. According to an embodiment the intermediate heat conducting element 160 is constituted by graphite with the corresponding properties as the first and second heat conducting layer 110, 120 but with anisotropic heat conduction in a direction perpendicular to the heat conduction of the first and second heat conducting layer 110, 120.

According to one embodiment the intermediate heat conducting element 160 is arranged in an aperture arranged to receive said intermediate heat conducting element 160. Said aperture is arranged to extend through the intermediate insulation layer 130, the control circuit 200 and the second housing element 520.

Further the insulation layer 130 could be adapted in thickness for the thermoelectric element 150 such that there is no space between the thermoelectric element 150 and the second heat conducting element 120.

According to an embodiment the first heat conducting layer 110 has a thickness in the range of 0.1-2 mm, e.g. 0.4-0.8 mm, the thickness depending among others depending on application and desired heat conduction and efficiency. According to an embodiment the second heat conducting layer 120 has a thickness in the range of 0.1-2 mm, e.g. 0.4-0.8 mm, the thickness depending among others on application and desired heat conduction and efficiency.

According to an embodiment the insulation layer 130 has a thickness in the range of 1-30 mm, e.g. 10-20 mm, the thickness depending among others on application and desired efficiency.

According to an embodiment the thermoelectric element 150 has a thickness in the range of 1-20 mm, e.g. 2-8 mm, according to a variant about 4 mm, the thickness depending among others on the application and desired heat conduction and efficiency. The thermoelectric element has according to an embodiment a surface in the range of 0.01 $mm^2$-200 $cm^2$.

The thermoelectric element 150 has according to an embodiment a squared or other arbitrary geometric shape, such for example hexagonal shape.

The intermediate heat conducting element 160 has a thickness being adapted such that it fills the space in the space between the thermoelectric element 150 and the heat conducting layer 120.

The first and second housing element has according to an embodiment a thickness in the range of 0.2-4 mm, e.g. 0.5-1 mm and depends among others on the application and efficiency.

According to an embodiment the surface of the surface element 100 is in the range of 25-8000 $cm^2$, e.g. 75-1000 $cm^2$. The thickness of the surface element is according to an embodiment in the range of 5-60 mm, e.g. 10-25 mm, the thickness depending among others on the application and desired heat conduction and efficiency.

Figure 4B:
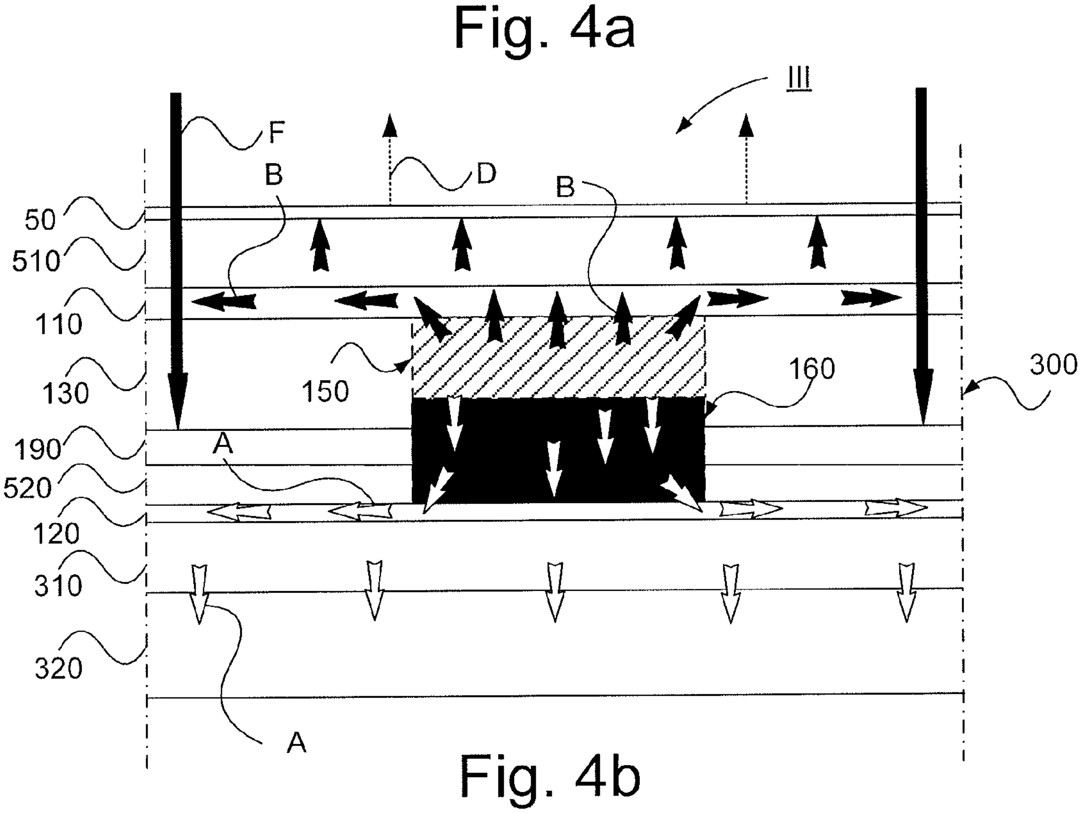
FIG. 4*b* schematically illustrates flows in a device according to an embodiment of the present invention.

FIG. 4*b*. schematically illustrate an exploded side view flows of the part III of a device for signature adaptation according to an embodiment of the present invention.

The device comprises a surface element 300 arranged to assume a determined thermal distribution, wherein said surface element comprises a housing, wherein said housing comprises a first housing element 510 and a second housing element 520, a first heat conducting layer 110, a second heat conducting layer 120, wherein said first and second heat conducting layers are mutually isolated by means of an intermediate insulation layer 130, and a thermoelectric element

150 arranged to generate a predetermined temperature gradient of a portion of said first heat conducting layer 110. The device further comprises at least one display surface 50 arranged to radiate at least one predetermined spectrum. The device also comprises an intermediate heat conducting element 160, such as for example described with reference to FIG. 4*a*.

Figure 6A:
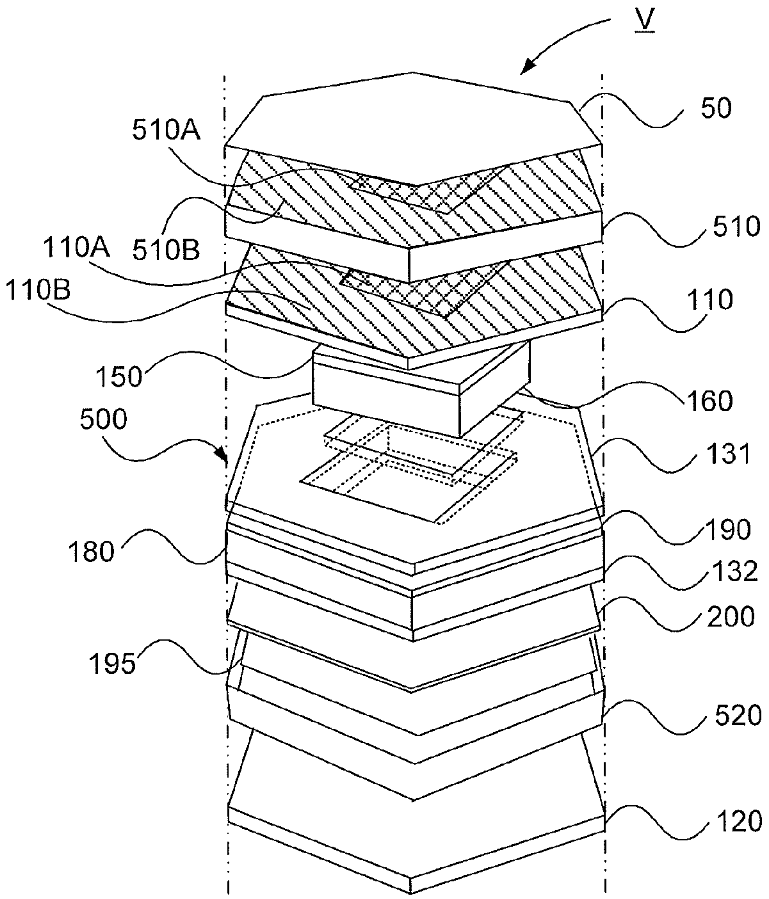
FIG. 6*a* schematically illustrates an exploded three dimensional view of different layers of a part of the device according to an embodiment of the present invention.

The surface element 300 according to certain embodiments, see e.g. FIG. 6*a*, comprises additional layers for e.g. applying of a surface element 300 to a vehicle. Here a third layer 310 and a fourth layer 320 are arranged for further diversion of heat and/or thermal contact to surface of e.g. vehicles.

As apparent from FIG. 4*b* the heat is transported from one side of the thermoelectric element 150 and transcends to the other side of the thermoelectric element and further through the intermediate heat conducting layer 160, heat transport being illustrated with white arrows A or non-filled arrows A and transport of cold is illustrated with black arrows B or filled arrows B, transport of cold physically implies diversion of heat having the opposite direction to the direction for transport of cold. Here it is apparent that the first and second heat conducting layer 110, 120, which according to an embodiment are constituted by graphite, have anisotropic heat conductibility such that the heat conductibility in the main direction of propagation, i.e. along the layer 110, 120, is considerably higher than the heat conductibility crosswise to the layer. Hereby heat or cold may be dispersed quickly on a large surface with relatively few thermoelectric elements and relatively low supplied power, whereby temperature gradients and hot spots are reduced. Further an even and constant desired temperature may be kept during a longer time.

Heat is transported further through the third layer 310 and the fourth layer 320 for diversion of heat.

As further apparent from FIG. 4*b* at least one spectrum comprising light of one or more wavelengths/frequencies is radiated from said at least one display surface 50, wherein said radiated light is illustrated with dashed arrows D.

Heat is transported from the first heat conducting layer 110 up into the first housing element and through said at least one display surface 50, which is arranged to have a thermal permeability. Hereby is facilitated a decoupling between the thermal and visual signature that is generated i.e. the thermal signature do not substantially affect the visual signature and vice versa.

With further reference to FIG. 4*b* incident radio within a predetermined frequency range are transmitted through the frequency selective surface that is formed in the first housing element 510 and in the first heat conducting layer 110 and through the intermediate insulation layer 130 in order to subsequently substantially be absorbed by the radar suppressing element 190.

Figure 5:
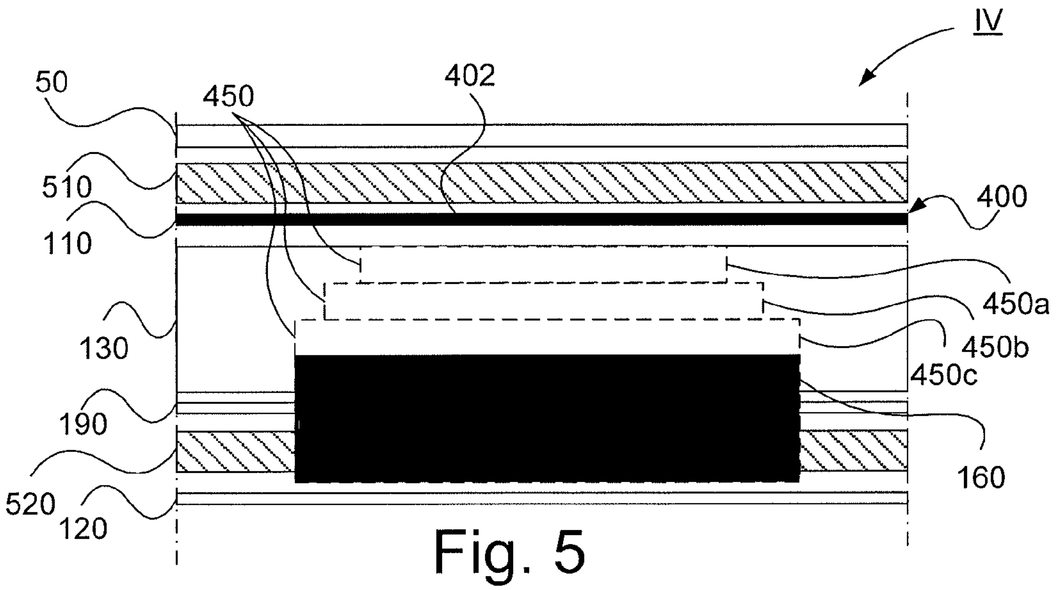
FIG. 5 schematically illustrates an exploded side view of a part of the device for thermal adaptation according to an embodiment of the present invention.

FIG. 5 schematically illustrates an exploded side view of a part IV of a device for signature adaptation according to an embodiment of the present invention.

The device according to this embodiment differs from the embodiment according to FIG. 4*a* only in that it comprises a housing, a first heat conducting layer, a second heat conducting layer, an intermediate insulation layer, a radar suppressing element, a display surface and three thermoelectric elements arranged on top of each other instead of that it comprises a housing, a first heat conducting layer, a second heat conducting layer, an intermediate insulation layer, a radar suppressing element a temperature generating element and a display surface.

The device comprises a surface element 400 arranged to assume a determined thermal distribution and to radiate at least one predetermined spectrum, wherein said surface element 400 comprises a first housing element 510 and a second housing element 520, a display surface 50, a first heat conducting layer 110, a second heat conducting layer 120, wherein said first and second heat conducting layers 110, 120 are mutually isolated by means of an intermediate insulation layer 130, and a thermoelectric element configuration 450 arranged to generate a predetermined temperature gradient to a portion of said first heat conducting layer 110.

According to an embodiment the device comprises an intermediate heat conducting layer 160 arranged in the insulation layer 130 inside of the thermoelectric element 150 to fill possible space between the thermoelectric element configuration 450 and the second heat conducting element 120. This in order for that heat conduction may occur more efficiently between the thermoelectric element configuration 450 and the second heat conducting element 120. The intermediate heat conducting element 160 has anisotropic heat conductibility, the heat conduction being considerably better crosswise to than along the element, i.e. conducts heat considerably better crosswise to the layers of the surface element 100, in accordance with what is illustrated in FIG. 4*a*.

The thermoelectric element configuration 450 comprises three thermoelectric elements 450*a*, 450*b*, 450*c* arranged on top of each other. A first thermoelectric element 450*a* being arranged outermost in the insulation layer of the surface element 400, a second thermoelectric element 450*b*, and a third thermoelectric element 450*c* being arranged innermost, wherein the second thermoelectric element 450*b* is arranged between the first and the third thermoelectric element.

When voltage is applied as the outer surface 402 of the surface element 400 is intended to be cooled such that heat is transported by means of the first thermoelectric element 450*a* from the surface and toward the second thermoelectric element 450*b*. The second thermoelectric element 450*b* is arranged to transport heat from its outer surface towards the third thermoelectric element 450*c* such that the second thermoelectric element 450*b* contributes to transporting excessive heat away from the first thermoelectric element 450*a*. The third thermoelectric element 450*c* is arranged to transport heat from its outer surface towards the second heat conducting layer 120, via the intermediate heat conducting element 160, such that the third thermoelectric element 450*c* contributes in transporting excessive heat away from the first and second thermoelectric elements. Hereby a voltage is applied over the respective thermoelectric element 450*a*, 450*b*, 450*c*.

Here an intermediate heat conducting element is arranged between the thermoelectric element configuration 450 and the second heat conducting element 120. Alternatively the thermoelectric element configuration 450 is arranged to fill the entire insulation layer such that no intermediate heat conducting element is required.

The respective thermoelectric element 450*a*, 450*b*, 450*c* has according to an embodiment a thickness in the range of 1-20 mm, e.g. 2-8 mm, according to a variant about 4 mm, the thickness depending among others on application and desired heat conduction and efficiency.

The insulation layer 130 according to an embodiment has a thickness in the range of 4-30 mm, e.g. 10-20 mm, the thickness depending among other on application and desired efficiency.

By using three thermoelectric elements arranged on top of each other as in this example, the net efficiency of heat transported away becomes higher than by using only on thermoelectric element. Hereby diversion of heat is rendered more efficient. This may e.g. be required during intense heat from the sun in order to efficiently divert heat.

Alternatively two thermoelectric elements arranged on top of each other may be used, or more than three thermoelectric elements arranged on top of each other.

FIG. 6*a* schematically illustrated in an exploded three dimensional view a part V of a device for signature adaptation according to an embodiment of the present invention.

Figure 6B:
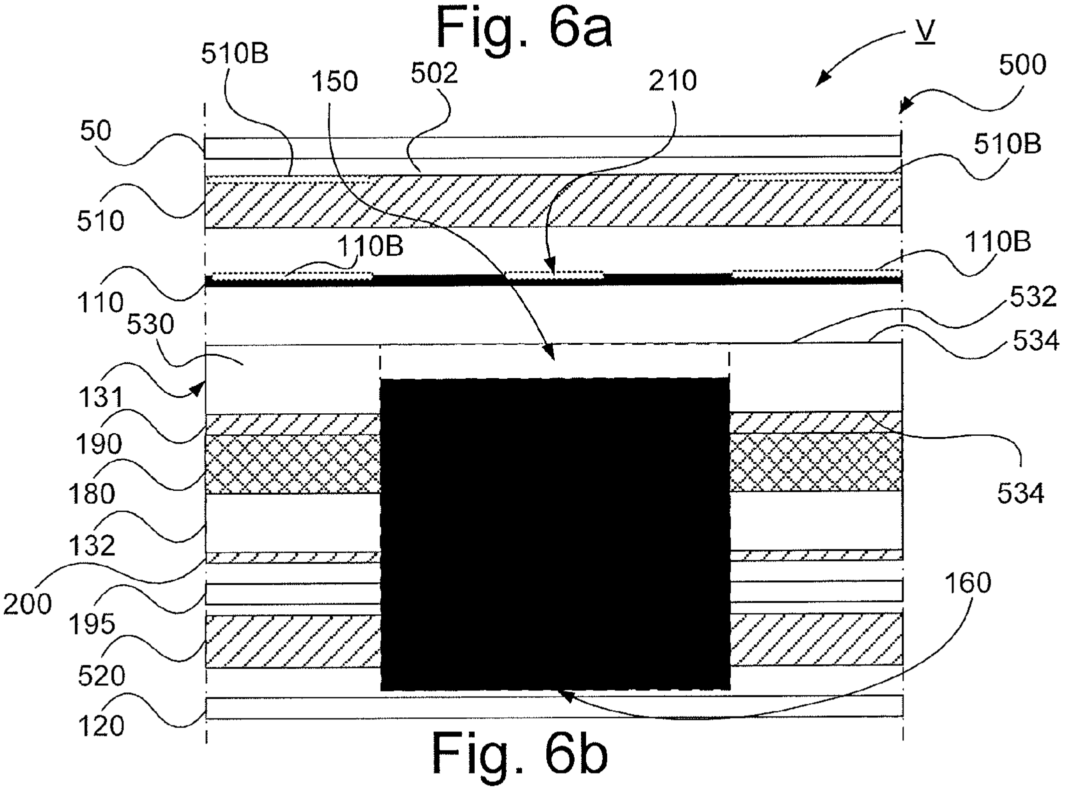
FIG. 6*b* schematically illustrates an exploded side view of different layer of a part of the device in FIG. 6*a;*

FIG. 6*b* schematically illustrated in an exploded side view a part V of a device for signature adaptation according to an embodiment of the present invention suitable for use on for example a military vehicle for signature adaptation The device comprises a surface element 500 arranged to assume a determined thermal distribution, wherein said surface element 500 comprises a housing, wherein said housing comprises a first housing element 510 and a second housing element 520, a first and second heat conducting layer 110, 120 wherein said first and second heat conducting layers 110, 120 are mutually heat insulated by means of a first intermediate insulation layer 131 and a second intermediate insulation layer 132, a control circuit 200, an interface material 195, an armouring element 180, a radar suppressing element 190, a thermoelectric element 150 arranged to generate a predetermined temperature gradient to a portion of said first heat conducting layer 110 and a display surface 50 arranged to radiate at least one predetermined spectrum.

Figure 12A:
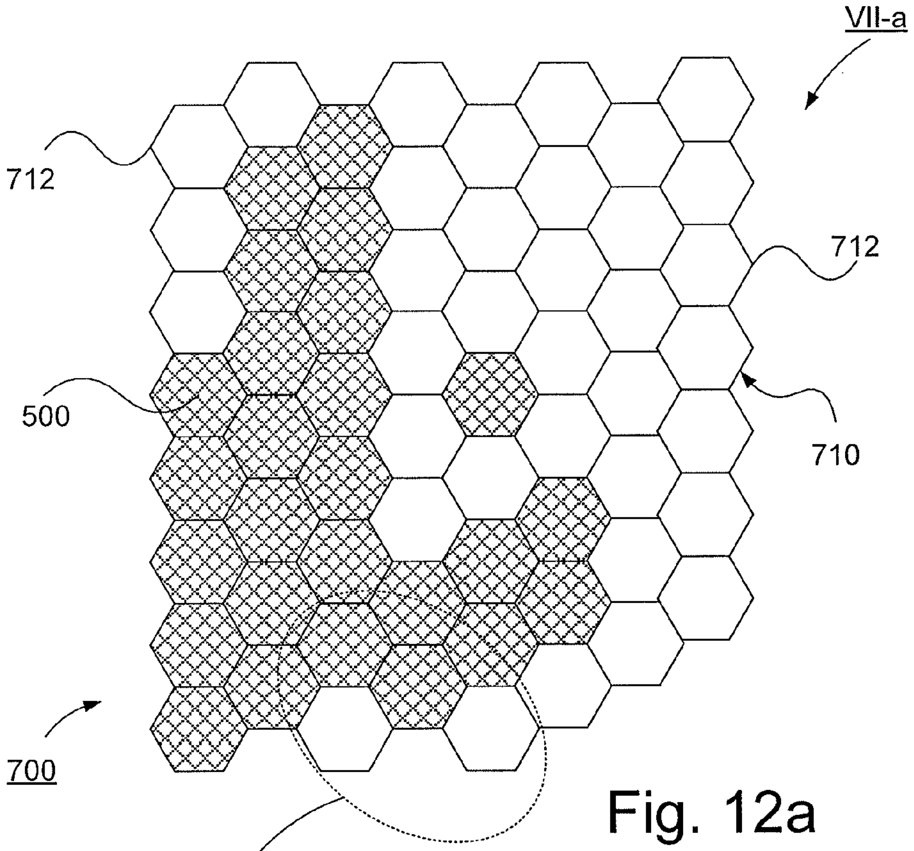
Figure 12B:
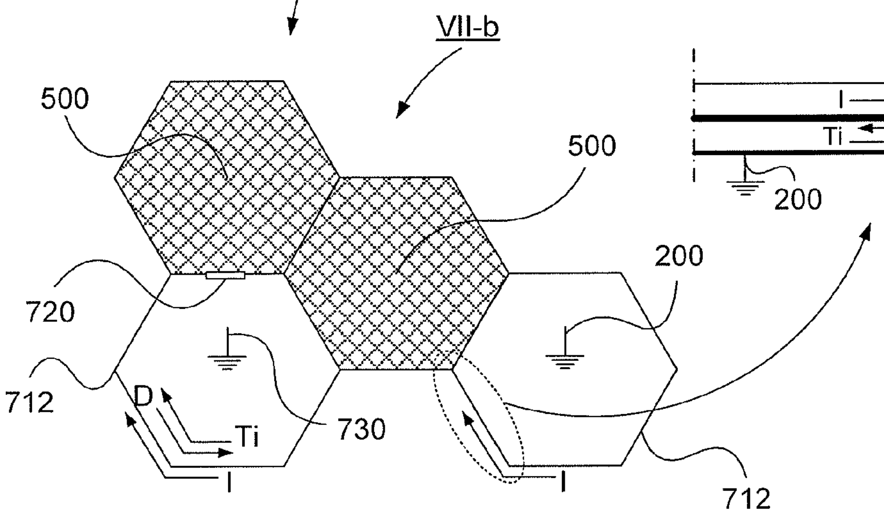
FIG. 12*b* schematically illustrates an enlarged part of the module system in FIG. 12*a;*
Figure 12C:
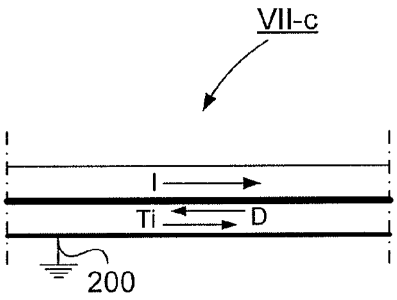
FIG. 12*c* schematically illustrates an enlarged part of the part in FIG. 12*b;*

The module element 500 constitutes according to a variant a part of the device which is interconnected by module elements, the module elements according to an embodiment being constituted by module elements according to FIG. 6*a-b*, wherein the module element forms a module system as shown in FIG. 12*a-c* for application on e.g. a vehicle.

The module element 500 according to this embodiment comprises a housing, wherein said housing comprises a first housing element 510 and a second housing element 520. The first housing element 510 is arranged as an upper protective casing. The second housing element is arranged as a base plate and is arranged to be applied, such as for example as described with reference to FIG. 12*a-g*, by means of fastening means to one or more structures and/or elements of a platform such as an object desired to be hidden by means of the visual and thermal adaptation enabled by the system. The first and second housing element together for a substantially impermeable casing of the first heat conducting layer 110, the first intermediate insulation layer 131 and the second intermediate insulation layer 132, the control circuit 200, the interface material 195, the armouring element 180, the radar suppressing element 190 and the thermoelectric element 150. The housing is composed of a material with efficient heat conductibility for conducting heat or cold from an underlying layer in order to facilitate representing the thermal structure, which according to an embodiment is a copy of the thermal background temperature. According to an embodiment the first housing element 510 and the second housing element 520 is made of aluminium, which has an efficient thermal conductibility and is robust and durable which results in a good outer protection and consequently renders suitable for cross country vehicles.

The module element 500 according to this embodiment comprises at least one display surface 50, such as exemplified with reference to FIG. 7*a-e*. Said at least one display surface is arranged on the upper side of the first housing element 510 such as for example arranged on the upper side of the first housing element by means of fastening means such as fastened by glue or screws.

The first heat conducting layer 110, which according to a preferred embodiment is constituted by graphite, is arranged under the outer layer 510. The second heat conducting layer 120 or inner heat conducting layer 120 is according to a preferred embodiment constituted by graphite.

The first heat conducting layer 110 and the second heat conducting layer 120 have anisotropic heat conductibility. Thus, the first and the second heat conducting layers respectively has such a composition and such properties that the longitudinal heat conductibility, i.e. heat conductibility in the main direction of propagation along the layer is considerably higher than the transversal heat conductibility, i.e. the heat conductibility crosswise to the layer, the heat conductibility along the layer being good. These properties are facilitated by means of graphite layers with layers of pure carbon, which is achieved by refinement such that higher anisotropy of the graphite layers is achieved. Hereby heat may be dispersed quickly on a large surface with relatively few thermoelectric elements, whereby temperature gradients and hot spots are reduced.

According to a preferred embodiment the ratio between longitudinal heat conductibility and transversal heat conductibility of the layer 110, 120 is greater than hundred. With increasing ratio it is facilitated to having the thermoelectric elements arranged on a larger distance from each other, which results in a cost efficient composition of module elements. By increasing the ratio between the heat conductibility along the layer 110, 120 and heat conductibility crosswise to the layers 110, 120 the layers may be made thinner and still obtain the same efficiency, alternatively make the layer and thus the module element 500 quicker.

One of the first and second heat conducting layers 110, 120 is arranged to be a cold layer and another of the first and second heat conducting layers 110, 120 is arranged to be a hot layer. According to an application e.g. for camouflaging of vehicles, the first heat conducting layer 110, i.e. the outer of the heat conducting layers, is the cold layer.

The graphite layers 110, 120 has according to a variant a composition such that the heat conductibility along the graphite layer is in the range of 300-1500 W/mK and the heat conductibility crosswise to the graphite layer is in the range of 1-10 W/mK.

According to an embodiment the module element 500 comprises an intermediate heat conducting element 160 arranged inside the housing. Where said intermediate heat conducting element 160 further is arranged to extend through an aperture centrally positioned in underlying layers/elements, said aperture arranged to receive the intermediate heat conducting element 160. Said aperture is arranged to partially or fully extend through the first insulation layer 131, the second insulation layer 132, the radar suppressing layer 190, the armouring element 180, the control circuit 200, the interface material 195 and the second housing element 520 to fill possible space between the thermoelectric element 150 and the second heat conducting element 120. This so that heat conducting may occur more efficiently between the thermoelectric element 150 and the second heat conducting element 120. The intermediate heat conducting element has anisotropic heat conductibility wherein the heat conduction is considerably better along the layers than crosswise to the layers of the surface element 300. This is apparent from FIG. 4*b*. According to an embodiment the intermediate heat conducting element 160 is constituted by graphite with corresponding properties as of the first and second heat conducting layer 110, 120 but with anisotropic heat conduction in a direction perpendicular to the heat conduction of the first and second heat conducting layers 110, 120.

The first and second insulation layers for thermal isolation is arranged between the first heat conducting layer 110 and the second heat conducting layer 120. The insulation layers are configured such that heat from the hot heat conducting layer 110, 120 minimally affects the cold heat conducting layer 120, 110 and vice versa. The insulation layers 131, 132 considerably improves performance of the module element 500/device. The first heat conducting layer 110 and the second heat conducting layer 120 are mutually thermally isolated by means of the intermediate insulation layers 131, 132. The thermoelectric element 150 is in thermal contact with the first heat conducting layer 110.

The first housing element 510 and the first heat conducting element 110 are arranged with a frequency selective surface structure, also referred to as a frequency selective subsurface area 5108, 1108. Said frequency selective subsurface area 5108, 1108 is arranged to surround a subsurface area 510A, 110A of said first housing element 510 and the first heat conducting element 110. Said subsurface area 510A, 110A is further arranged to be free of frequency selective surface structure.

According to an embodiment said subsurface area 510A, 110A of said first housing element 510 and the first heat conducting element 110 is arranged on a surface opposite to the surface to which said at least one thermoelectric element 150 is arranged. The extension of said subsurface area 510A, 110A corresponds to the extension of said at least one thermoelectric element 150.

According to an embodiment said subsurface area 510A, 110A of said first housing element 510 and the first heat conducting element 110 is arranged on a surface opposite to the surface to which said at least one thermoelectric element 150 is arranged. The extension of said subsurface area 510A, 110A corresponds to the extension of said at least one thermoelectric element 150.

According to an embodiment said radar suppressing element 190 is integrated in said first heat conducting layer 110. According to this embodiment the surface element 500 does not comprise any separate radar suppressing element 190. According to this embodiment said first heat conducting layer 110 further does not comprise any frequency selective surface structure. According to this embodiment said first heat conducting layer 110 is formed of a material that enables both good heat transmission properties and radar absorbing properties such as for example graphite. According to this embodiment the entire surface of said first housing element 510 is provided with frequency selective surface structure so that incident radio waves are filtered and where the filtered radio waves that are transmitted through the first housing element are suppressed by the underlying heat conducting layer 110. According to this embodiment said control circuit may further be arranged to provide control signals to said at least one thermoelectric element 150 to compensate for possible heating that may occur in said first heat conducting layer 110 due to absorption of incident filtered radio waves. This may for example be achieved by utilizing information from the temperature sensing means 210. By providing radar suppressive functionality in said first heat conducting layer 110 it is achieved that the surface element 500 efficiently may absorb incident radio waves over its entire surface and not only the surface surrounding said at least one thermoelectric element. Furthermore it is facilitated to construct the surface element so it becomes thinner and lighter since need for a separate radar suppressing element is rendered un-necessary.

According to an embodiment the first insulation layer 131 is arranged between the first heat conducting element 110 and the radar suppressing element 190.

According to an embodiment said first intermediate insulation layer 131 is constituted by a material that enables transmission of incident radio waves from a radar system.

According to an embodiment the second insulation layer 132 is arranged between the armouring element 180 and the control circuit 200.

According to an embodiment at least one of the first and second insulation layers 131, 131, such as for example the first insulation layer 131, is a vacuum based element 530 or a vacuum based layer 530. Hereby both radiant heat and convection heat are reduced due to interaction between material, which is relatively high in conventional insulation materials having a high degree of confined air, i.e. porous materials such as foam, glass fibre fabric, or the like, occurs to a very low degree, the air pressure being in the range of hundred thousand times lower than conventional insulation materials.

According to an embodiment the vacuum based element 530 is covered with high reflection membranes 532. Thereby transport of heat in the form of electromagnetic radiation, which does not need to interact with material for heat transportation, is counteracted.

The vacuum based element 530 consequently results in very good isolation, and further has a flexible configuration for different applications, and thereby fulfils many valuable aspects where volume and weight are important. According to an embodiment the pressure in the vacuum based element lies in the range of 0.005 and 0.01 torr.

According to an embodiment at least one of the first and second insulation layers 131, 132, such as for example the first insulation layer 131, comprises screens 534 or layers 534 with low emission arranged to considerably reduce the part of the heat transport occurring through radiation. According to an embodiment at least one of the first and second insulation layers 131, 132, such as for example the first insulation layer 131, comprises a combination of vacuum based element 530 and low emissive layers 534 in a sandwich construction. This gives a very efficient heat isolator and may give k-values as good as 0.004 W/m K.

According to an embodiment at least one of the first and second insulation layers 131, 132 is formed of a thermally isolating foam material or other suitable thermally insulating material.

According to an embodiment the first housing element 510 and the first heat conducting layer 110 are each arranged to provide a frequency selective surface 535, 536 such as exemplified with reference to FIG. 8.

The radar suppressing element 190 is according to an embodiment arranged between the first insulation layer 131 and the armouring element 180.

Figure 9:
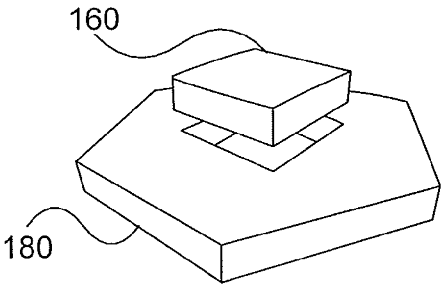
FIG. 9 schematically illustrates an exploded three dimensional view of different layers of a part of the device according to an embodiment of the present invention.

The armouring element 180 such as exemplified with reference to FIG. 9 is according to an embodiment arranged between the radar suppressing element and the second insulation layer 132.

The control circuit 200 is according to an embodiment arranged between the second insulation layer 132 and the interface material 195. Where the control circuit is arranged to provide control signals/voltage/current to said at least one display surface and said thermoelectric element 150.

The interface material 195 is according to an embodiment arranged between the control circuit 200 and the second housing element 520. The interface material 195 is arranged to provide means for fastening the control circuit 200 to the second housing element 520 and to conduct heat from the control circuit 200 to the second housing element 520. By providing an interface material 195 as described above it is facilitated to efficiently conduct heat away from the control circuit so that the control circuit is prevented from overheating and so that it do not affect the upper layers when these are intended to be cooled.

The module element 500 further comprises a temperature sensing means 210, which according to an embodiment is constituted by a thermal sensor. The temperature sensing means 210 is arranged to sense the present temperature. According to a variant the temperature sensing means 210 is arranged to measure a voltage drop through a material being arranged outermost on the sensor, said material having such properties that it changes resistance depending on temperature. According to an embodiment the thermal sensor comprises two types of metals which in their boundary layers generate a weak voltage depending on temperature. This voltage arises from the Seebeck-effect. The magnitude of the voltage is directly proportional to the magnitude of this temperature gradient. Depending on which temperature range measurements are to be performed different types of sensors are more suitable than others, where different types of metals generating different voltages may be used. The temperature is then arranged to be compared to continuous information from a thermal sensing means arranged to sense/copy the thermal background, i.e. the temperature of the background. The temperature sensing means 210, e.g. a thermal sensor, is fixed on the upper side of the first heat conducting layer 110 and the temperature sensing means in the form of e.g. a thermal sensor may be made very thin and may according to an embodiment be arranged in the first heat conducting layer, e.g. the graphite layer, in which a recess for countersinking of the sensor according to an embodiment is arranged.

The module element 500 further comprises the thermoelectric element 150. The thermoelectric element 150 is according to an embodiment arranged in the first insulation layer 131. The temperature sensing means 210 is according to an embodiment arranged in layer 110 and in close connection to the outer surface of the thermoelectric element 150. A voltage is applied to the thermoelectric element 150 wherein the thermoelectric element 150 is configured in such a way that when a voltage is applied, heat from one side of the thermoelectric element 150 transcends into the other side of the thermoelectric element 150. When the by means of the sensing means 210 sensed temperature when compared to the temperature information from the thermal sensing means differs from the temperature information, the voltage to the thermoelectric element 150 is arranged to be regulated such that actual values correspond to reference values, wherein the temperature of the module element 500 is adapted accordingly by means of the thermoelectric element 150.

The thermoelectric element is according to an embodiment a semiconductor functioning according to the Peltier effect. The Peltier effect is a thermoelectric phenomena arising when a dead current is allowed to float over different metals or semiconductors. In this way a heat pump cooling one side of the element and heating the other side may be created. The thermoelectric element comprises two ceramic plates with high thermal conductivity. The thermoelectric element according to this variant further comprises semiconductor rods which are positively doped in one end and negatively doped in the other end such that when a current is flowing though the semiconductor, electrons are forced to stream such that one side becomes hotter and the other side colder (deficiency of electrons). During change of direction of current, i.e. by changed polarity of the applied voltage, the effect is the opposite, i.e. the other side becomes hot and the first cold. This is the so called Peltier effect, which consequently is being utilized in the present invention.

According to an embodiment the module element 500 further comprises a third heat conducting layer (not shown) in the form of a heat pipe layer or heat plate layer arranged beneath the second heat conducting layer 120 for dispersing heat for efficiently divert excessive heat. The third heat conducting layer, i.e. the heat pipe layer/heat plate layer comprises according to a variant sealed aluminium or copper with internal capillary surfaces in the shape of wicks, the wicks according to a variant being constituted by sintered copper powder. The wick is according to a variant saturated with liquid which under different processes either is vaporized or condensed. Type of liquid and wick is determined by the intended temperature range and determines the heat conductibility.

The pressure in the third heat conducting layer, i.e. the heat pipe layer/heat plate layer is relatively low, wherefore the specific steam pressure makes the liquid in the wick vaporizing in the point in which heat is applied. The steam in this position has a considerably higher pressure than its surrounding which results in it dispersing quickly to all areas with lower pressure, in which areas it condenses into the wick and emits its energy in the form of heat. This process is continuous until an equilibrium pressure has arisen. This process is at the same time reversible such that even cold, i.e. lack of heat can be transported with the same principle.

The advantage of using layers of heat pipes/heat plate is that they have very efficient heat conductibility, substantially higher than e.g. conventional copper. The ability to transport heat, so called Axial Power Rating (APC), is impaired with the length of the pipe and increases with its diameter. The heat pipe/heat plate together with the heat conducting layers facilitate quick dispersal of excessive heat from the underside of the module elements 500 to underlying material due to their good ability to distribute heat on large surfaces. By means of heat pipe/heat plate quick diversion of excessive heat which e.g. is required during certain sunny situations is facilitated. Due to the quick diversion of excessive heat efficient work of the thermoelectric element 150 is facilitated, which facilitates efficient thermal adaptation of the surrounding continuously.

According to this embodiment the first heat conducting layer and the second heat conducting layer are constituted by graphite layers such as described above and the third heat conducting layer is constituted by heat pipe layers/heat plate layers. According to a variant of the invention the third heat conducting layer may be omitted, which results in a slightly reduced efficiency but at the same time reduces costs. According to an additional variant the first and/or the second heat conducting layer may be constituted by heat pipe layer/heat plate layer, which increase the efficiency but at the same time increases the costs. In case the second heat conducting layer is constituted by heat pipe layer/heat plate layer the third heat conducting layer may be omitted.

According to an embodiment the module element 500 further comprises a thermal membrane (not shown). According to this embodiment the thermal membrane is arranged underneath the third heat conducting layer. The thermal membrane facilitates good thermal contact on surfaces with small irregularities such as body of motor vehicles which irregularities otherwise may result in impaired thermal contact. Hereby the possibility to divert excessive heat and thus efficient work of the thermoelectric element 150 is improved. According to an embodiment the thermal membrane is constituted by a soft layer with high thermal conductivity which results in the module element 500 obtaining good thermal contact against e.g. the body of the vehicle, which facilitates good diversion of excessive heat.

Above, the module element 500 and its layers have been described as flat. Other alternative shapes/configurations are also conceivable. Further other configurations than those that have been described relating to relative placement of the elements/layers of the module element are conceivable. Further other configurations than those that have been described relating to number of element/layers and their respective function are conceivable.

The first heat conducting layer 110 has according to an embodiment a thickness in the range of 0.1-2 mm, e.g. 0.4-0.8 mm, the thickness among others depending on application and desired heat conduction and efficiency. The second heat conducting layer 120 has according to an embodiment a thickness in the range of 0.1-2 mm, e.g. 0.4-0.8 mm, the thickness among others depending on application and desired heat conduction and efficiency.

The first and second insulation layers 131, 132 have according to an embodiment a thickness in the range of 1-30 mm, e.g. 2-6 mm, the thickness among others depending on application and desired efficiency.

The thermoelectric element 150 has according to an embodiment a thickness in the range of 1-20 mm, e.g. 2-8 mm, according to a variant about 4 mm, the thickness among other depending on application and desired heat conduction and efficiency. The thermoelectric element according to an embodiment has a surface in the range of 0.01 $mm^2$-200 $cm^2$.

The intermediate heat conducting element 160 has a thickness being adapted such that it fills the space between the thermoelectric element 150 and the second heat conducting layer 120. According to an embodiment the intermediate heat conducting element has a thickness in the range of 5-30 mm, e.g. 10-20 mm, according to a variant 15 mm, the thickness among others depending on application and desired heat conduction and efficiency.

The first and second housing element according to an embodiment have a thickness in the range of 0.2-4 mm, e.g. 0.5-1 mm and depends among others on application and efficiency.

The thermal membrane according to an embodiment has a thickness in the range of 0.05-1 mm, e.g. about 0.4 mm and depends among others on application.

The third heat conducting layer in the shape of a heat pipe/heat plate according to above has according to an embodiment a thickness in the range of 2-8 mm, e.g. about 4 mm, the thickness among others depending on application, desired efficiency and heat conduction.

The surface of the module element/surface element 500 is according to an embodiment in the range of 25-2000 $cm^2$, e.g. 75-1000 $cm^2$. The thickness of the surface element is according to an embodiment in the range of 5-60 mm, e.g. 10-25 mm, the thickness among others depending on desired heat conduction and efficiency, and materials of the different layers.

Figure 7A:
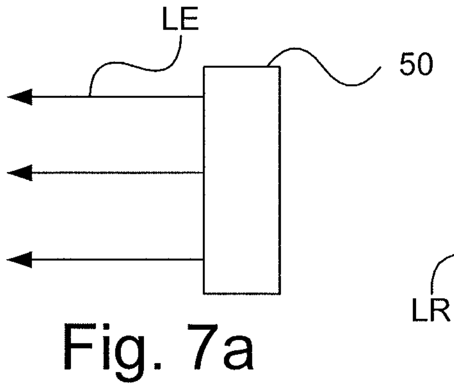
FIG. 7*a* schematically illustrates a side view a type of display layer of a part of the device according to an embodiment of the present invention.

FIG. 7*a* schematically illustrates a side view of the display surface according to an embodiment of the present invention.

According to an embodiment the display surface 50 is of emitting type. By display surface of emitting type is intended a display surface that actively generates and radiates light LE. Examples of display elements of emitting type is for example a display surface that uses any of the following techniques: LCD ("Liquid Crystal Display"), LED ("Light Emitting Diode"), OLED ("Organic Light emitting Diode") or other suitable emitting technology that is based on both organic or non-organic electro-chrome technology or technology similar thereto.

Figure 7B:
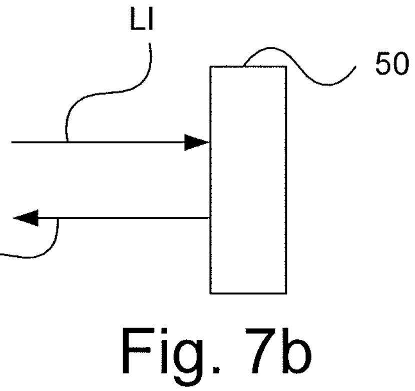
FIG. 7*b* schematically illustrates a side view a type of display layer of a part of the device according to an embodiment of the present invention.

FIG. 7*b* schematically illustrates a side view of the display surface according to an embodiment of the present invention.

According to a preferred embodiment the display surface 50 is of reflecting type. By display surface of reflecting type is intended a display surface arranged to receive incident light LI and radiate reflected light LR by means of using said incident light LI. Examples of display elements of emitting type is for example a display surface that uses any of the following techniques: ECI ("Electrically Controllable Organic Electro chromes"), ECO ("Electrically Controllable Inorganic Electro chromes"), or other suitable reflecting technology such as "E-ink", electrophoretic, cholesteric, MEMS (Micro Electro-Mechanical System) coupled to one or more optical films, or electro fluidic. By utilizing a display surface 50 of reflecting type it is enabled to produce at least one spectrum that realistically reflects structures/colours since this type uses naturally incident light instead of self producing light such as for example display surfaces of emitting type such an LCD do. Common for a display surface of a reflecting type is that an applied voltage enables modification of reflection properties for each individual picture element P1-P4. By controlling the applied voltage for each picture element each picture element is thereby enabled to reproduce a certain colour upon reflection of incident light that is dependent on the applied voltage.

According to an alternative embodiment the display surface 50 is of reflecting and emitting type such as multi-modal liquid crystal (Multimode LCD). Where said display surface 50 according to this embodiment is arranged to both emit at least one spectrum and reflect at least one spectrum.

Figure 7C:
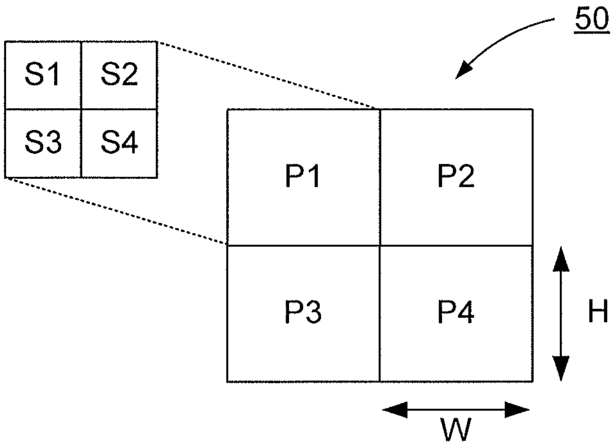
FIG. 7*c* schematically illustrates a plan view of a part of a display layer of a part of the device according to an embodiment of the present invention.

FIG. 7*c* schematically illustrates a top view of the display surface according to an embodiment of the present invention.

The display surface 50 comprises a plurality of picture elements ("pixels") P1-P4, wherein said picture elements P1-P4 each comprises a plurality of sub elements ("subpixels") S1-S4. Said picture elements P1-P4 have an extension in height H and an extension in width W.

According to an embodiment the picture elements each have an extension in height H in the range of 0.01-100 mm, e.g. 5-30 mm.

According to an embodiment the picture elements each have an extension in width W in the range of 0.01-100 mm, e.g. 5-30 mm.

According to an embodiment each picture element P1-P4 comprises at least three sub elements S1-S4. Where each of said at least three sub elements is arranged to radiate one of the primary colours red, green or blue (RGB) or the secondary colours cyan, magenta, yellow or black (CMYK). By controlling the light intensity that is radiated from the respective sub element using control signals each picture element may radiate any colour/spectrum such as for example black or white.

According to an embodiment each picture element P1-P4 comprises at least four sub elements S1-S4. Where each of said four sub elements is arranged to radiate one of the primary colours red, green or blue (RGB) or the secondary colours cyan, magenta, yellow or black (CMYK) and wherein one of said four sub elements is arranged to radiate one or more spectrums that comprises components falling outside of the visual wave lengths such as for example arranged to radiate one or more spectrums that comprises components within the infrared wave lengths. By radiating one or more spectrum comprising components falling within the infrared area and one or more components falling within the visual area it is enabled to apart from controlling the visual signature to also control the thermal signature using the components falling within the infrared area. This facilitates shortening the response time associated to adapting the thermal signature using said thermoelectric element 150.

Said display surface may be arranged according to several different configurations differing as compared to the exemplified display surface with reference to FIG. 7*c*. As an example more or fewer picture elements may be part of the configurations and these picture elements may comprise more or fewer sub elements.

The display surface is according to one embodiment constituted by thin film, such as for example thin film substantially constituted by polymer material. Said thin film may comprise one or more active and/or passive layers/thin layers and one or more components such as electrically responsive components/layers or passive/active filters.

The display surface 50 is according to one embodiment constituted by flexible thin film.

The display surface 50 according to an embodiment has a thickness in the range of 0.01-5 mm, e.g. 0.1-0.5 mm and depends among others on application and desired efficiency.

According to an embodiment the picture elements P1-P4 of the display surface 50 has a width in the range of 1-5 mm, e.g. 0.5-1.5 mm and a height in the range of 1-5 mm, e.g. 0.5-1.5 mm, wherein the dimensioning among others depending on application and desired efficiency.

According to an embodiment the display surface 50 has a thickness in the range of 0.05-15 mm, e.g. 0.1-0.5 mm, according to a variant about 0.3 mm, wherein the thickness among others depending on application and thermal permeability, colour reproduction and efficiency.

According to an embodiment the display surface 50 is configured to have an operating temperature range that comprises the temperature range in which thermal adaptation is desired to be performed, such as for example within −20-150° C. This facilitates that reproduction of at least one predetermined spectrum for desired visual adaptation is substantially un-affected by desired temperature for thermal adaptation from underlying layers.

According to an embodiment the display surface 50 is of emitting type and arranged to provide directionally dependent reflection. As an example each picture element of the display surface 50 may be arranged to alternately provide at least two different spectrums. This may be accomplished by providing at least two of each other independent control signals such that each picture element reproduces at least two different spectrums at least two different points in time, defined by one or more update frequencies.

Figure 7D:
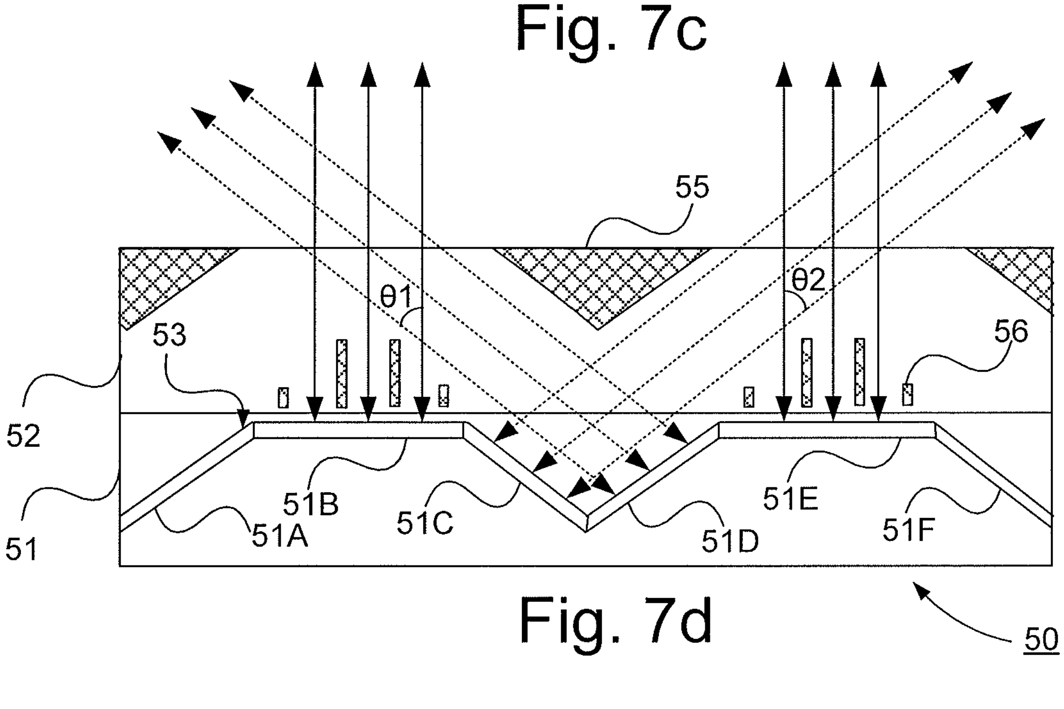
FIG. 7*d* schematically illustrates a side view of a display layer according to an embodiment of the present invention.

FIG. 7*d* schematically illustrates a side view of a display surface according to an embodiment of the present invention.

According to an embodiment the display surface 50 is of reflecting type and arranged to provide directionally dependent reflection. According to this embodiment the display surface comprises at least one first underlying display layer 51 and a second upper display layer 52. Said first display layer 51 is arranged as a reflective layer comprising at least one curved reflective surface 53. According to this embodiment the profile of said at least one curved reflective surface is formed as a number of trapezoids. Said second display layer 52 is arranged as an obstructing layer comprising at least one optical filter structure, 55, 56, wherein said at least one filter structure is arranged to obstruct incident light of selected angles of incidence and thereby obstruct reflection from the first display layer 51. Said curved reflective surface 53 comprises a plurality of subsurfaces 51A-F, each arranged to reflect incident light within a predetermined angular range or in a predetermined angle. According to this embodiment the curved reflective surface 53 comprises a first subsurface 51B and a second subsurface 51E arranged substantially parallel to the plane constituted by the display surface. Said first and second subsurface are arranged to reflect light, substantially incident orthogonally to the display surface 50. The curved reflective surface 53 further comprises a third subsurface 51A, a fourth subsurface 51C, a fifth subsurface 51D and a sixth subsurface 51F. Said fourth and sixth subsurfaces 51C, 51F are arranged to reflect light, incident within a predetermined angular range, that is displaced in a first predetermined angle 81, relative the orthogonal axis. Said third and fifth subsurfaces 51A, 51D are arranged to reflect light, incident within a predetermined angular range, that is displaced in a second predetermined angle 82, relative the orthogonal axis, wherein said first predetermined angle falls on an opposite side of the orthogonal axis relative said second predetermined angle.

According to an embodiment the obstructing layer comprises at least one first filter structure 55. Where said at least one first filter structure 55 is arranged as a triangle having an extension along a vertical direction of the display surface i.e. shaped as a triangular prism.

According to an embodiment the obstructing layer comprises at least one second filter structure 56, wherein said at least one second filter structure 56 is arranged as a plurality of taps/rods having an extension along an orthogonal direction of the display surface, wherein the length of said at least one second filter structure 56 is configured so as to avoid obstructing light, incident within said predetermined angular range, that is displaced in a first predetermined angle relative the orthogonal axis and light, incident within said predetermined angular range, that is displaced in a second predetermined angle relative the orthogonal axis. This facilitates limiting the angular range within which reflection of light, incident substantially orthogonal towards the display surface takes place.

Figure 7E:
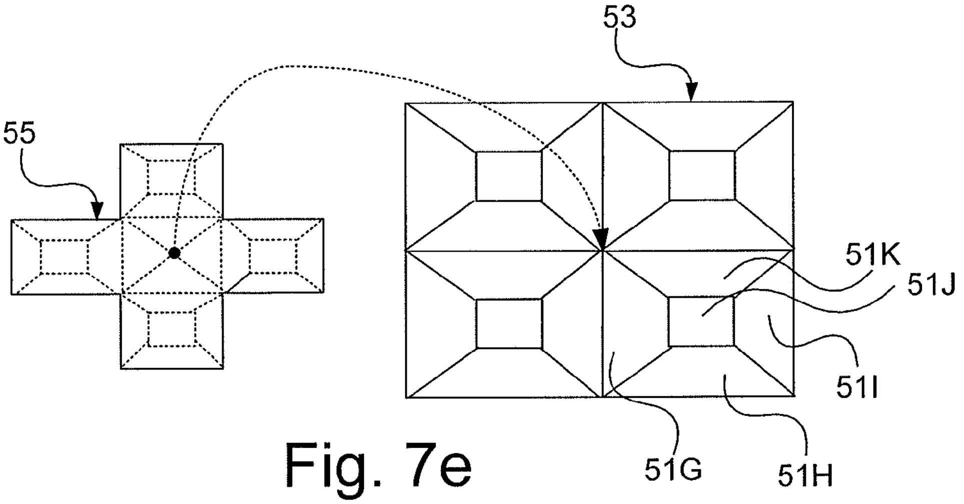
FIG. 7*e* schematically illustrates a plan view of a display layer according to an embodiment of the present invention.

FIG. 7*e* schematically illustrates a plan view of parts of the display surface according to an embodiment of the present invention.

According to an embodiment said curved reflective surface 53 is arranged to form a three dimensional pattern, wherein said three dimension pattern comprises a number of columns and a number of rows of truncated pyramids, i.e. a matrix of pyramids where an upper structure of the pyramids have been cut in a plane, parallel to the bottom surface of the pyramid. According to this embodiment said at least one first filter structure 55 of the obstructing layer 52 is formed as a central pyramid surrounded by truncated pyramids, whose tapered direction of extensions are opposite to the truncated pyramids of the reflecting layer. A centre point of the obstructing layer that is defined by the position of the top of the centrally positioned pyramid with associated truncated pyramids arranged along the sides of the centrally positioned is arranged to be centered above the intersection point that is formed between the rows and the columns of truncated pyramids of the reflection layer 53, such as illustrated by the dashed arrow in FIG. 7*e*. By means of arranging the curved reflecting surface 53 and the filter structures 55 as described above, slits orthogonal to the respective subsurface of said reflecting surface are formed that are free of obstruction, whereby directionally dependent reflection is enabled, where reflection of the incident light that falls within said slits is enabled. According to this embodiment each subsurface 51G-51K formed by the front surfaces of the truncated pyramids of the curved reflecting layer is arranged to provide at least one picture element each. This facilitates individually adapted reflection of incident light, falling within five different angles of incidence or five different ranges of angles of incidence.

By providing a directionally dependent display surface 50 according to FIG. 7*d-e* is facilitated to reproduce at least one spectrum such as one or more patterns and colours in different viewing angles relative an orthogonal axis of the display surface. Hereby is also facilitated to radiate different patterns and colours in different viewing angles.

The configuration of the display surface 50 may differ from the configuration described with reference to FIG. 7*d*-*e*. Placement and configuration of filter structures of said obstructing layer may as an example be configured differently. Also the number of filter structures may differ. Said first display layer 51 may be arranged as an emitting layer. The display surface 50 may comprise more or fewer layers. Further interference phenomena's together with one of more reflection layers, optical retardation layers and one or more circular polarized or one or more linearly polarized layers in combination with one or more quarter wave retardation layers may be utilized to provide directionally dependent reflection.

According to an embodiment the display surface 50 comprise at least one barrier layer, wherein said at least one barrier layer is arranged to have thermal and visual permeability and to be substantially impermeable to moisture and liquid. By applying the at least one barrier layer to the display surface robustness and endurance are improved in terms of external environmental influence.

FIG. 8*a* schematically illustrates a plan view of a structure of the device for signature adaptation according to an embodiment of the present invention.

With reference to FIG. 8*a* it is shown a frequency selective display surface FSS arranged in at least one element/layer of the device.

According to this embodiment the frequency selective surface FSS such exemplified in FIG. 6*b* is integrated in the first housing element 510 and the first heat conducting layer 110.

The frequency selective surface FSS may for example be provided by formation of a plurality of resonant slit elements such as "patches" arranged in the first housing element 510 and the first heat conducting element 110 or arranged as trough structures STR extending through the first housing element and the first heat conducting layer 110, wherein each of the through structures STR for example is formed as crossed dipoles. Said resonant slit elements are formed in a suitable geometrical pattern, for example in a periodic metallic pattern so that suitable electrical properties are reached. By configuring the form of respective plurality of resonant elements and the geometrical pattern formed by said plurality of resonant elements it is facilitated that incident radio waves (RF, "radio frequencies") generated by radar systems are filtered/transmitted through said frequency selective surface. As an example the frequency selective surface may be arranged to pass through radio waves of one or more frequencies, wherein said one or more frequencies is related to a frequency range, typically associated to radar systems such as of a frequency within the range of 0.1-100 GHz, e.g. 10-30 GHz.

According to this embodiment said plurality of resonant elements are formed as through structures arranged peripherally from the centre of said first heat conducting element 110 and said first housing element 510, so that these do not overlap underlying temperature generating element 150, whereby the heat conductibility from underlying temperature generating element 150 to upper structures of surface elements substantially is un-affected.

According to this embodiment the device comprises a radar suppressing element 190 also referred to as a radar absorbing element 190. Said radar absorbing element 190 is arranged to absorb incident radio waves generated by radar systems.

According to an embodiment said plurality of resonant slit elements are shaped according to any of the following alternatives quadratic, rectangular, circular, Jerusalem cross, dipoles, wires, crossed wires, two-periodic strips or other suitable frequency selective structure.

According to an embodiment said frequency selective surface FSS is arranged to be combined with at least one layer constituted by electrically controllable conductive polymers, whereby the frequency range or the frequency that the frequency selective surface is arranged to pass through can be controlled by means of application of a voltage to said at least one layer of said electrically controllable conductive polymers.

According to an alternative embodiment one or more micro electro-mechanical system structures (MEMS) may be integrated into said frequency selective surface and wherein said one or more MEMS structure are arranged to control permeability of said frequency selective surface for radio waves within different frequency ranges.

According to an embodiment the radar absorbing element 190 has a thickness in the range of 0.1-5 mm, e.g. 0.5-1.5 mm, wherein the thickness among others depending on application and desired efficiency.

According to an embodiment said radar absorbing layer is formed by a layer covered with a paint layer comprising iron balls ("Iron ball paint"), comprising small spheres covered with carbonyl iron or ferrite. Alternatively said paint layer comprises both ferrofluidic and non-magnetic substances.

According to an embodiment said radar absorbing element is formed by a material comprising a neoprene polymeric layer with ferrite granules or "carbon black" particles comprising a percentage portion of crystalline graphite embedded in the polymer matrix formed by said polymeric layer. The percentage portion of crystalline graphite may for example be in the range of 20-40% such as for example 30%.

According to an embodiment said radar absorbing element is formed by a foam material. As an example said foam material may be formed by urethane foam with "carbon black".

According to an embodiment said radar absorbing element is formed by a nano material.

FIG. 8*b* schematically illustrates a plan view of temperature flows in a structure of the device for signature adaptation according to an embodiment of the present invention.

With reference to FIG. 8*b* it is shown a frequency selective surface FSS arranged in at least one element/layer of the device.

According to this embodiment the frequency selective surface FSS, such exemplified in FIG. 6*b*, is integrated into the first housing element 510 and the first heat conducting element 110. The resonant elements according to this embodiment are formed in a geometrical metallic pattern surrounding the application area 510A or 110A to which said at least one thermoelectric element 150 is arranged so that a plurality of slits free of said plurality of resonant elements. Said plurality of slits are arranged to extend along substantially straight lines in the plane of the first heat conducting surface and the first housing element, wherein said plurality of slits extend from a central point of said application area. This facilitates efficient transport of heat along said plurality of slits out to the peripheral portions of said first heat conducting layer 110 and said first housing element 510, wherein heat transport is illustrated with arrows E.

FIG. 9 schematically illustrates an exploded three dimensional view of an armouring element of the device for signature adaptation according to an embodiment of the present invention.

According to an embodiment of the invention of the device, the surface element comprises at least one armouring element 180, such as exemplified according to FIG. 6*a*-*b*, arranged to protect at least one of the surface element underlying structure against direct fire, explosions and/or bursting fragments. By providing at least one armouring element of the surface element is facilitated modular armour of objects clad with a plurality of surface element, wherein individual forfeited surface elements easily may be exchanged.

According to an embodiment the armouring element 180 is constituted by aluminium oxide such as for example $AL_2O_3$ or other similar material with good properties in terms of ballistic protection.

According to an embodiment the armouring element 180 has a thickness in the range of 4-30 mm, e.g. 8-20 mm, wherein the thickness among others depending on application and desired efficiency.

According to an embodiment of the device according to the invention the heat conducting element 160 is formed of a material with good properties relating to heat conductibility and ballistic protection such as for example silicon carbide SiC.

According to an embodiment at least one of said heat conducting element and the armouring element 180 is formed by nano material.

The armouring element 180 and/or the heat conducting element 160 may be arranged to provide ballistic protection at least according to the protection class as defined by NATO-standard, 7.62 AP WC ("STANAG Level 3").

According to an embodiment of the device according to the invention, the surface element, such as exemplified with reference to FIG. 4*a* or FIG. 6*a*-*b*, comprises at least one electro-magnetic protection structure (not shown) arranged to provide protection against electro-magnetic pulses (EMP), which may be generated by weapon systems that aims to disable electronic systems. Said at least one electro-magnetic protection structure may for example be formed by a thin layer that absorbs/reflects electro-magnetic radiation such as for example a thin layer of aluminium foil or other suitable material.

According to an alternative embodiment one or more sub structures are arranged to provide a screening cage that enclose at least the control circuit.

According to an alternative embodiment the surface element is arranged to provide a screening cage and at least one thin layer arranged to absorb/reflect electro-magnetic radiation.

According to an embodiment of the device according to the invention the housing of the surface element is arranged to be water proof to enable marine application areas wherein the surface elements are mounted on structures situated under and/or above water level of a naval vessel.

Figure 10:
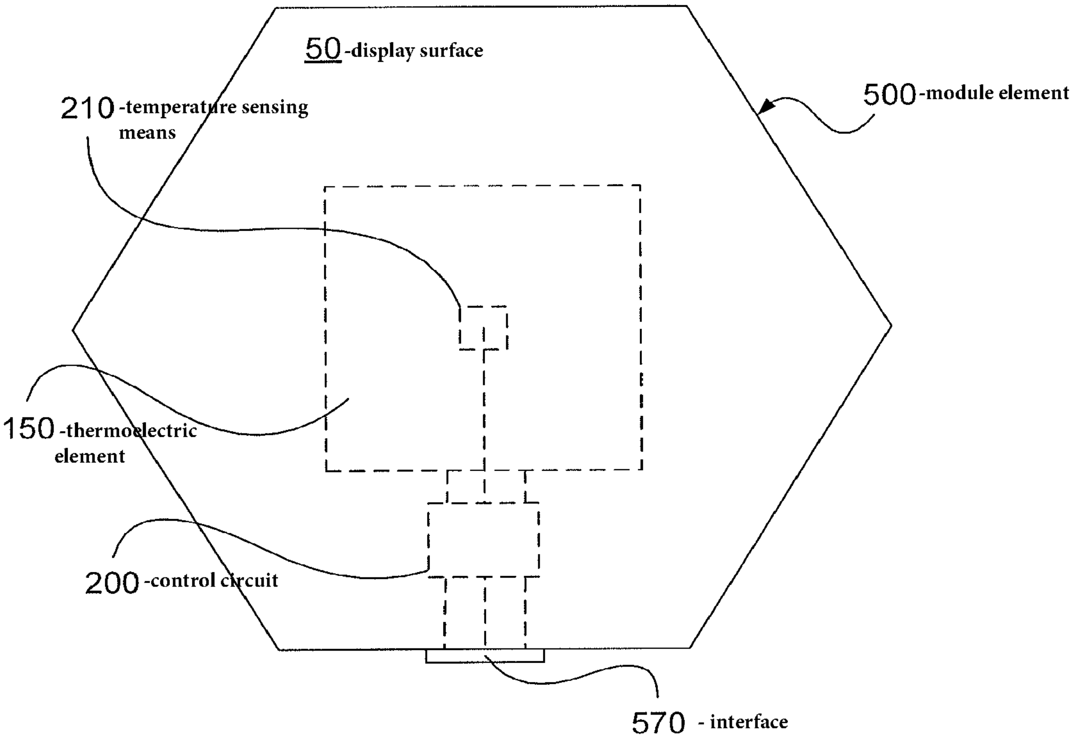
FIG. 10 schematically illustrates a plan view of a device according to an embodiment of the present invention.

FIG. 10 schematically illustrates a plan view of a module element 500 according to an embodiment of the present invention.

According to this embodiment the module element 500 is hexagonally shaped. This facilitates simple and general adaptation and assembly during composition of module systems e.g. according to FIG. 12*a*-*c*. Further an even temperature may be generated on the entire hexagonal surface, wherein local differences in temperature may arise in corners of e.g. a squarely shaped module element may be avoided.

The module element 500 comprises a control circuit 200 connected to the thermoelectric element 150 and said at least one display surface 50, wherein the thermoelectric element 150 is arranged to generate a predetermined temperature gradient to a portion of the first heat conducting layer 110 of the module element 500 according to FIG. 5*a*, the predetermined temperature gradient is provided by means of that voltage is applied to the thermoelectric element 150 from the control circuit, the voltage being based upon temperature data or temperature information from the control circuit 200.

The module element 500 comprises an interface 570 for electrically connecting module elements for interconnection into a module system. The interface comprises according to an embodiment a connector 570.

The module element may be dimensioned as small as a surface of about 5 $cm^2$, the size of the module element being limited by the size of the control circuit.

FIG. 11 schematically illustrates a device VI for signature adaptation according to an embodiment of the present invention.

The device comprises a control circuit 200 or control unit 200 and a surface element 500 e.g. according to FIG. 6*a*, 6*b* wherein the control circuit is connected to surface elements 500. The device further comprises at least one display surface 50 and a thermoelectric element 150. Said at least one display surface 50 is arranged to receive voltage/current from the control circuit 200, the display surface 150 according to above being configured in such a way that when a voltage is applied, at least one spectrum is radiated from one side of the display surface 50. Said thermoelectric element 150 is arranged to receive voltage from the control circuit 200, the thermoelectric element 150 according to above being configured in such a way that when a voltage is applied, heat from one side of the thermoelectric element 150 transcends into the other side of the thermoelectric element.

The device according to this embodiment comprises a temperature sensing means 210 arranged to sense the present temperature of the surface element 500. The temperature sensing means 210 is according to an embodiment as shown in e.g. FIG. 6*a* arranged on or in connection to the outer surface of the thermoelectric element 150 such that the temperature being sensed is the outer temperature of the surface element 500.

The control circuit 200 comprises a thermal sensing means 610 arranged to sense temperature such as background temperature. The control circuit 200 further comprises a software unit 620 arranged to receive and process temperature data from the thermal sensing means 610. The thermal sensing means 610 is consequently connected to the software unit 620 via a link 602 wherein the software unit 620 is arranged to receive a signal representing background data.

The control circuit 200 comprises a visual sensing means 615 arranged to sense visual structure such as one or more visual structures descriptive of objects in a surrounding of the device. Said software unit 620 is arranged to receive and process visual structure data comprising one or more images/image sequences. The visual sensing means 615 is consequently connected to the software unit 620 via a link 599 wherein the software unit 620 is arranged to receive a signal representing background visual structure data.

The software unit 620 is further arranged to receive instructions from a user interface 630 with which it is arranged to communicate. The software unit 620 is connected to the user interface 630 via a link 603. The software unit 620 is arranged to receive a signal from the user interface via the link 603, said signal representing instruction data, i.e. information of how the software unit 620 is to software-process temperature data from the thermal sensing means 610 and visual structure data from the visual sensing means 615. The user interface 630 may e.g. when the device is arranged on e.g. a military vehicle and intended for thermal and visual camouflaging and/or adaptation with a specific thermal and/or visual pattern of said vehicle be configured such that an operator, from an estimated direction of threat, may chose to focus available power of the device to achieve the best imaginable signature to the background. This is elucidated in more detail in FIG. 14.

According to this embodiment the control circuit 200 further comprises an analogue/digital converter 640 connected via a link 604 to the software unit 620. The software unit 620 is arranged to receive a signal via the link 604, said signal representing information packages from the software unit 620 and arranged to convert the information package, i.e. information communicated from the user interface 630 and processed temperature data. The user interface 630 is arranged to determine from that or from which direction of threat that has been chosen, which camera/video-camera/IR-camera/sensor that shall deliver the information to the software unit 620. According to an embodiment all the analogue information is converted in the analogue/digital converter 640 to binary digital information via standard A/D-converters being small integrated circuits. Hereby no cables are required. According to an embodiment described in connection to FIG. 12*a-c* the digital information is arranged to be superposed on a current supplying framework of the vehicle.

The control circuit 200 further comprises a digital information receiver 650 connected to the digital/analogue converter 640 via a link 605. From the software unit 620, information is sent analogue to the digital/analogue converter 640 where information about which temperature (desired value) each surface element shall have registered. All this is digitalized in the digital/analogue converter 640 and sent according to standard procedure as a digital sequence comprising unique digital identities for each surface element 500 with associated information about desired value etc. This sequence is read by the digital information receiver 650 and only the identity corresponding to what is pre-programmed in the digital information receiver 650 is read. In each surface element 500 a digital information receiver 650 with a unique identity is arranged. When the digital information receiver 650 senses that a digital sequence is approaching with the correct digital identity it is arranged to register the associated information and remaining digital information is not registered. This process takes place in each digital information receiver 650 and unique information to each surface element 500 is achieved. This technique is referred to as CAN technique.

The control circuit further comprises a temperature control circuit 600 connected via a link 605 to the analogue/digital converter 640. The temperature control circuit 600 is arranged to receive a digital signal in the form of digital trains representing temperature data via the link 605.

The temperature sensing means 210 is connected to the temperature control circuit via a feedback link 205, wherein the temperature control circuit 600 is arranged to receive a signal representing temperature data sensed by means of the temperature sensing means 210 via the link 205.

The temperature control circuit 600 is connected to the thermoelectric element via links 203, 204 for application of voltage to the thermoelectric element 150. The temperature control circuit 600 is arranged to compare temperature data from the temperature sensing means 210 with temperature data from the thermal sensing means 610, wherein the control circuit 600 is arranged to send a current to/apply a voltage, over the thermoelectric element 150, that corresponds to the difference in temperature so that the temperature of the surface element 500 is adapted to the background temperature. The temperature sensed by means of the temperature sensing means 210 is consequently arranged to be compared with continuous temperature information from the thermal sensing means 610 of the control circuit 200.

The temperature control circuit 600 according to this embodiment comprises the digital information receiver 650, a so called PID-circuit 660 connected to the digital information receiver 650 via a link 606, and a regulator 670 connected via a link 607 to the PID-circuit. In the link 606 a signal representing specific digital information is arranged to be sent in order for each surface element 500 to be controllable such that desired value and actual value correspond.

The regulator 670 is then connected to the thermoelectric 150 via the links 203, 204. The temperature sensing means 210 is connected to the PID-circuit 660 via the link 205, wherein the PID-circuit is arranged via the link 205 to receive the signal representing temperature data sensed by means of the temperature sensing means 210. The regulator 670 is arranged via the link 607 to receive a signal from PID-circuit 660 representing information to increase or decrease current supply/voltage to the thermoelectric element 150.

The control circuit 200 further comprises a digital information receiver 655 connected to the digital/analogue converter 640 via a link 598. From the software unit 620, information is sent analogue to the digital/analogue converter 640 where information about which visual structure each surface element shall have registered. All this is digitalized in the digital/analogue converter 640 and sent according to standard procedure as a digital sequence comprising unique digital identities for each surface element 500. This sequence is read by the digital information receiver 655 and only the identity corresponding to what is pre-programmed in the digital information receiver 655 is read. In each surface element 500 a digital information receiver 655 with a unique identity is arranged. When the digital information receiver 655 senses that a digital sequence is approaching with the correct digital identity it is arranged to register the associated information and remaining digital information is not registered. This process takes place in each digital information receiver 655 and unique information to each surface element 500 is achieved. This technique is referred to as CAN technique.

The control circuit 200 further comprises an image control circuit 601 connected to the digital/analogue converter 640 via a link 598. The image control circuit 601 is arranged to receive a digital signal in the form of digital trains representing visual structure data such as data representing one or more images/image sequences via the link 598.

The image control circuit 601 is connected to the display surface 50 via links 221, 222 for application of voltage to the display surface 50. The image control circuit 601 is arranged to receive visual structure data from said visual sensing means and store said visual structure data in at least one memory buffer, wherein the image control circuit 601 is arranged to continuously read said memory buffer at a predetermined time interval and send at least one signal/current to/apply at least one voltage over the display surface 50 that correspond to desired light intensity/reflection property of each of the sub elements S1-S4 of each picture element P1-P4 so that the at least one spectrum radiated of the surface of the surface element 500 is adapted to the visual background structure that is described by said visual structure data.

The image control circuit 601 according to this embodiment comprises the digital information receiver 655, a image control device 665 connected to the digital information receiver 655 via a link 625 and a image regulator 675 connected to the image control device 665 via a link 626. The image control device 665 comprises at least data processing means and a memory unit. The image control device 665 is arrange to receive data from the digital information receiver 655 and store this data in a memory buffer of said memory unit. The image control device is further arranged to process data stored in said memory buffer such as for example by means of in a predetermined update frequency implementing a Look-Up-Table (LUT) or other suitable algorithm that maps data stored in the memory buffer to individual picture elements P1-P4 and/or sub elements S1-S4 of the display surface 50 of the surface element 500. In the link 625 a signal representing specific digital information is arranged to be sent in order for the display surface 50 of surface element 500 to be controllable such that radiated at least one spectrum from the display surface 50 and registered data from the digital information receiver correspond. In the link 626 a signal representing specific digital information is arranged to be sent in order for the respective picture element P1-P4 and/or sub elements S1-S4 of the display surface 50 of surface element 500 to be controllable such that radiated at least one spectrum from the display surface 50 and registered data from the digital information receiver correspond.

The image regulator 675 is then connected to the display surface 50 via the links 221, 222. The image regulator 675 is arranged via the link 626 to receive a signal from image control device 655 representing information to increase or decrease current supply/voltage to the respective picture elements P1-P4 and/or sub elements S1-S4 of the display surface 50. The image regulator 675 is further arranged to send one or more signals to the display surface 50 via the links 221, 222 in dependence of the received signal from the image control device 655. Said one or more signals arranged to be sent to the display surface 50 from the image regulator may comprise one or more of the following signals: pulse modulated signals, pulse amplitude modulated signals, pulse width modulated signals, pulse code modulated signals, pulse displacement modulated signals, analogue signals (current, voltage), combinations and/or modulations of said one or more signals.

The thermoelectric element 150 is configured in such a way that when the voltage is applied, heat from one side of the thermoelectric element 150 transcends to the other side of the thermoelectric element 150. When the temperature sensed by means of the temperature sensing means 210 by comparison with the temperature information from the thermal sensing means 150 differs from the temperature information from the thermal sensing means 150 the voltage to the thermoelectric element 150 is arranged to be regulated such that actual value and desired value correspond, wherein the temperature of the surface of the surface element 500 is adapted accordingly by means of the thermoelectric element.

According to an embodiment the thermal sensing means 150 comprises at least one temperature sensor such as a thermometer arranged to measure the temperature of the surrounding. According to another embodiment the thermal sensing means 150 comprises at least one IR-sensor arranged to measure the apparent temperature of the background, i.e. arranged to measure an average value of the background temperature. According to yet another embodiment the thermal sensing means 150 comprises at least one IR-camera arranged to sense the thermal structure of the background. These different variants of thermal sensing means described in more detail in connection to FIG. 12*a*-*c*.

According to an embodiment said temperature control circuit 600 is arranged to send temperature information relating to actual and/or desired values to the software unit 620. According to this embodiment said software unit 620 is arranged to process actual and/or desired values together with characteristics descriptive of response times for temperature control in order to provide temperature compensation information. Where said temperature compensation information is sent to the image control circuit 601 that is arranged to provide information causing said at least one display surface 50 to radiate at least one wave length component that falls within the infrared spectrum apart from providing at least one spectrum corresponding to the visual structure of the background. This facilitates improved response time related to achieving thermal adaptation.

According to an embodiment the control circuit 200 comprise a distance detection means (not shown) such as a laser range finder arranged to measure distance and angle to one or more objects in the surroundings of the device. Said software unit 620 is arranged to receive and process distance data and angular data from the distance detection means. The distance detection means is consequently connected to the software unit 620 via a link (not shown), wherein the software unit is arranged to receive a signal representing distance data and angular data. Said software unit 620 is arranged to process temperature data and visual structure data by relating temperature data and visual structure data to distance data and angular data such as associating distance and angle to objects in the background. Said software unit 620 is further arranged to apply at least one transform such as a perspective transform based on said temperature data and visual structure data with associated related distance and angle in combination with data describing characteristics of said thermal sensing means and said visual sensing means. Hereby are enabled projections of at least one selected object/structures of temperature and/or visual structure with a modified perspective and/or distance. This may for example be used to generate a fake signature such as described with reference to FIG. 14 so that reproduction of the object desired to be resembled may be modified so that distance to the object and the perspective of the object changes relative to the distance and perspective that the thermal sensing means and/or the visual sensing means perceives.

According to this embodiment the user interface 630 may be arranged to provide an interface that enables an operator to select at least one object/structure that is desired to be reproduced visually and thermally. In order to enable modifications of perspectives the software unit 620 may further be arranged to register and process data describing distance and angle to objects/structures over a period of time, during which said device or object/structures a are positioned so that at least of each other independent different views of said objects/structures are perceived by said thermal sensing means and/or said visual sensing means.

In the cases where the surface element 500 comprises a radar absorbing element, such as for example according to FIG. 8*a*-*b*, the control circuit according to an embodiment is arranged to communicate wirelessly. By providing at least one wireless transmitter- and receiver-unit and by utilizing at least one resonant slit element STR of the frequency selective surface structure as antenna wireless communication is enabled. According to this embodiment the control circuit may be arranged to communicate on a short-wave frequency range such as for example on a 30 GHz band. This facilitates reducing the number of links associated to communication of data/signals in said control circuit and/or in the support structure/framework such described with reference to FIG. 12*g*.

The configuration of the control circuit may differ from the configuration described with reference to FIG. 11. The control circuit may for example comprise more or fewer sub components/links. Further one or more parts may be arranged externally of the control circuit 200, such as arranged in an external central configuration where for example the user interface 630, the software unit 620, the digital/analogue converter 640, the temperature sensing means 610 and the visual sensing means 615 are arranged to provide data and process data for at least one surface element 500, comprising a local control circuit, comprising said temperature control circuit 600 and said image control circuit 601 communicatively connected to said centrally configured digital/analogue converter.

FIG. 12*a* schematically illustrates parts VII-a of a module system 700 comprising surface elements 500 or module elements 500 to represent thermal background or corresponding; FIG. 12*b* schematically illustrates an enlarged part VII-b of the module system in FIG. 12*a*; and FIG. 12*c* schematically illustrates an enlarged part VII-c of the part in FIG. 12*b*.

The individual temperature regulation and/or visual control is arranged to occur in each module element 500 individually by means of a control circuit, e.g. the control circuit in FIG. 11, arranged in each module element 500. Each module element 500 is according to an embodiment constituted by the module element in FIG. 6*a-b*.

The respective module element 500 has according to this embodiment a hexagonal shape. In FIG. 12*a-b* the module elements 500 are illustrated with a checked pattern. The module system 700 comprises according to this embodiment a framework 710 arranged to receive respective module element. The framework according to this embodiment has a honeycomb configuration, i.e. is interconnected by means of a number of hexagonal frames 712, the respective hexagonal frame 712 being arranged to receive a respective module element 500.

The framework 710 is according to this embodiment arranged to supply current. Each hexagonal frame 712 is provided with an interface 720 comprising a connector 720 by means of which the module element 500 is arranged to be electrically engaged. Digital information representing background temperature sensed by means of the thermal sensing means according to e.g. FIG. 11 is arranged to be superposed on the frame work 710. As the framework itself is arranged to supply current the number of cables may be reduced. In the framework current will be delivered to each module element 500 but at the same time also, superposed with the current, a digital sequence containing unique information for each module element 500. In this way no cables will be needed in the framework.

The framework is dimensioned for in height and surface receiving module elements 500.

A digital information receiver of respective module element such as described in connection to FIG. 11 is then arranged to receive the digital information, wherein a temperature control circuit and a image control circuit according to FIG. 11 is arranged to regulate according to described in connection to FIG. 11.

According to an embodiment the device is arranged on a craft such as a military vehicle. The framework 710 is then arranged to be fixed on e.g. the vehicle wherein the framework 710 is arranged to supply both current and digital signals. By arranging the framework 710 on the body of the vehicle the framework 710 at the same time provides fastening to the body of the craft/vehicle, i.e. the framework 710 is arranged to support the module system 700. By using the module element 500 the advantage is among others achieved that if one module element 500 would fail for some reason only the failed module element needs to be replaced. Further the module element 500 facilitates adaptation depending on application. A module element 500 may fail depending on electrical malfunctions such as short-circuits, outer affection and due to damages of shatter and miscellaneous ammunition.

Electronics of respective module element is preferably encapsulated in respective module element 500 such that induction of electrical signals in e.g. antennas is minimized.

The body of e.g. the vehicle is arranged to function as ground plane 730 while the framework 710, preferably the upper part of the framework is arranged to constitute phase. In FIG. 12*b-c* I is the current in the framework, Ti a digital information containing temperatures and visual structures to the module element I, and D is deviation, i.e. a digital signal telling how big difference it is between desired value and actual value for each module element. This information is sent in the opposite direction since this information should be shown in the user interface 630 according to e.g. FIG. 11 such that the user knows how good the temperature adaptation of the system is for the moment.

A temperature sensing means 210 according to e.g. FIG. 11 is arranged in connection to the thermoelectric element 150 of respective module element 500 to sense the outer temperature of that module element 500. The outer temperature is then arranged to be continuously compared with background temperature sensed by means of the thermal sensing means such as described above in connection to FIG. 10 and FIG. 11. When these differ, means such as a temperature control circuit described in connection to FIG. 11, is arranged to regulate the voltage to the thermoelectric element of the module element such that actual values and desired values correspond. The degree of signature efficiency of the system, i.e. the degree of thermal adaptation that may be achieved, depends on which thermal sensing means, i.e. which temperature reference, that is used—temperature sensor, IR-sensor or IR-camera.

As a result of the thermal sensing means according to an embodiment being constituted by at least one temperature sensor such as a thermometer arranged to measure the temperature of the surrounding, a less precise representation of the background temperature, but a temperature sensor has the advantage that it is cost efficient. In application with vehicles or the like temperature sensor is preferably arranged in air intake of the vehicle in order to minimize influence of heated areas of the vehicle.

As a result of the thermal sensing means according to an embodiment being constituted by at least one IR-sensor arranged to measure the apparent temperature of the background, i.e. arranged to measure an average value of the background temperature a more correct value of the background temperature is achieved. IR-sensor is preferably placed on all sides of a vehicle in order to cover different directions of threat.

As a result of the thermal sensing means according to an embodiment being constituted by an IR-camera arranged to sense the thermal structure of the background, an almost perfect adaptation to the background may be achieved, the temperature variations of a background being representable on e.g. a vehicle. Here, a module element 500 will correspond to the temperature which the set of pixels occupied by the background at the distance in question. These IR-camera pixels are arranged to be grouped such that the resolution of the IR-camera corresponds to the resolution being representable by the resolution of the module system, i.e. that each module element correspond to a pixel. Hereby a very good representation of the background temperature is achieved such that e.g. heating of the sun, snow stains, water pools, different emission properties etc. of the background often having another temperature than the air may be correctly represented. This efficiently counteracts that clear contours and large evenly heated surfaces are created such that a very good thermal camouflaging of the vehicle is facilitated and that temperature variations on small surfaces may be represented.

As a result of the visual sensing means according to an embodiment being constituted by a camera, such as a video camera, arranged to sense the visual structure (colour, pattern) of the background, an almost perfect adaptation to the background may be achieved, the visual structure of a background being representable on e.g. a vehicle. Here, a module element 500 will correspond to the visual structure which the set of pixels occupied by the background at the distance in question. These video camera pixels are arranged to be grouped such that the resolution of the video camera corresponds to the resolution being representable by the resolution of the module system, i.e. that each respective module element correspond to a number of pixels (picture elements) defined by the number of picture element that are arranged on the display surface of respective module elements. Hereby a very good representation of the background structure is achieved so that for example even relatively small visual structures that are picked up by the video camera are reproduced correctly. One or more video cameras are preferably positioned on one or more sides of a vehicle in order to cover reproduction seen from several different threat directions. In the cases where the display surface is configured to be directionally dependent, such as for example according to FIG. 7*d-e*, the visual structure sensed by the visual sensing means at different angles may be used to individually control picture elements adapted for image reproduction in different observation angles so that these reproduce the visual structure that correspond to the direction in which it is sensed by the visual sensing means.

Figure 12D:
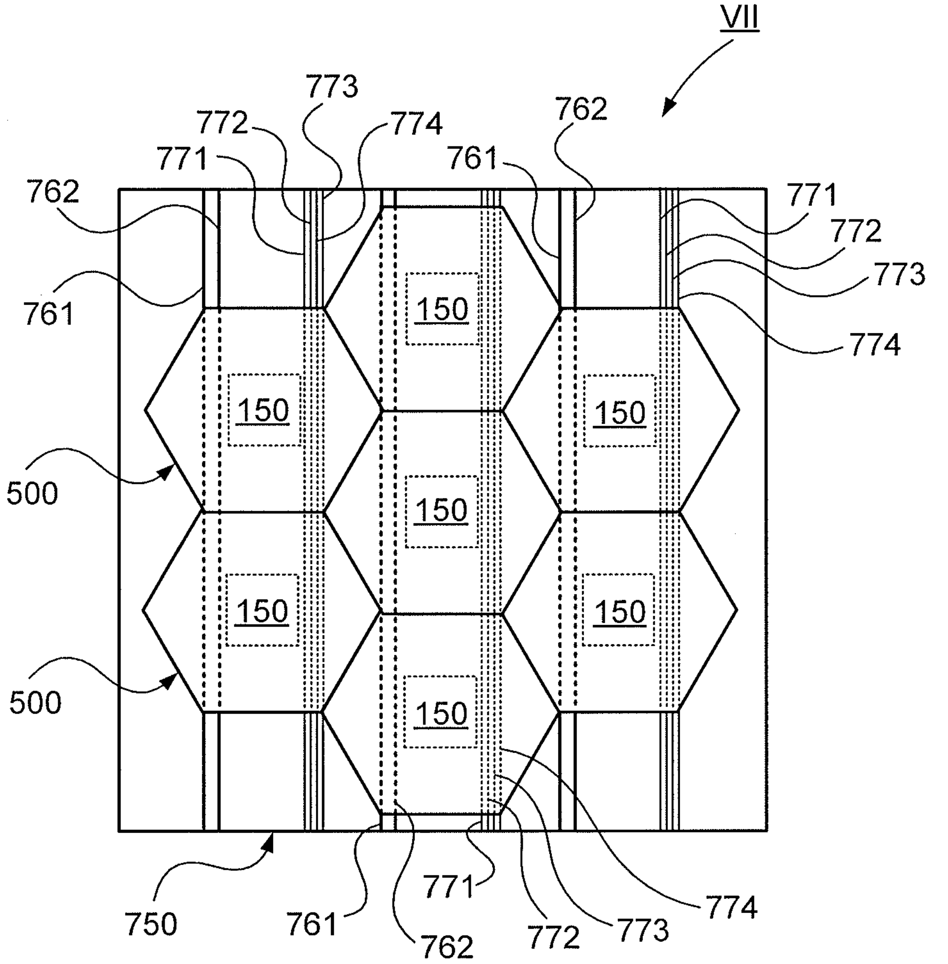
FIG. 12*d* schematically illustrates a plan view of a module system comprising elements for recreating thermal and/or visual background or similar according to an embodiment of the present invention.
Figure 12E:
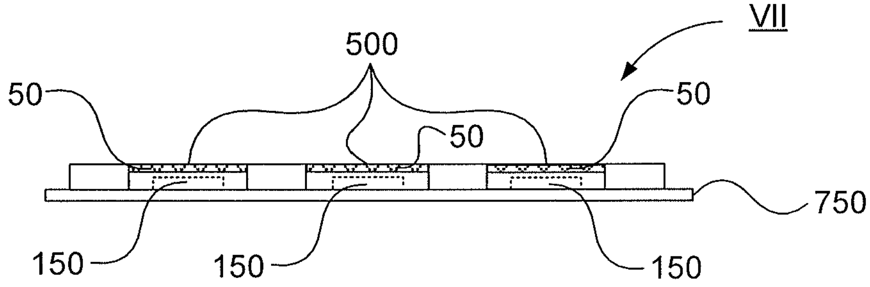
FIG. 12*e* schematically illustrates a side view of the module system in FIG. 12*d;*

FIG. 12*d* schematically illustrates a plan view of a module system VII or part of a module system VII comprising surface elements for signature adaptation according to an embodiment of the present invention, and FIG. 12*e* schematically illustrates a side view of the module system VII in FIG. 12*d*.

The module system VII according to this embodiment differs from the module element 700 according to the embodiment illustrated in FIG. 12*a-c* in that instead of a support structure constituted by a framework 710, a support structure 750 constituted by one or more support members 750 or support plates 750 for supporting interconnected module elements 500 is provided.

The support structure may thus be formed by one support member 750 as illustrated in FIG. 12*a-c*, or a plurality of interconnected support members 750.

The support member is made of any material fulfilling thermal demands and demands concerning robustness and durability. The support member 750 is according to an embodiment made of aluminium, which has the advantage that it is light and is robust and durable. Alternatively the support member 750 is made of steel, which also is robust and durable.

The support member 750 having a sheet configuration has according to this embodiment an essentially flat surface and a square shape. The support member 750 could alternatively have any suitable shape such as rectangular, hexagonal, etc.

The thickness of the support member 750 is in the range of 5-30 mm, e.g. 10-20 mm.

Interconnected module elements 500 comprising temperature generating elements 150 and display surface 50 as described above are arranged on the support member 750. The support member 750 is arranged to supply current. The support member 750 comprises links 761, 762, 771, 772, 773, 774 for communication to and from each single module element, said links being integrated into the support member 750.

According to this embodiment the module system comprises a support member 750 and seven interconnected hexagonal module elements 500 arranged on top of the support member 750 in such a way that a left column of two module elements 500, an intermediate column of three module elements 500 and a right column of two module elements 500 is formed. One hexagonal module element is thus arranged in the middle and the other six are arranged around the middle module element on the support member 750.

According to this embodiment current supply signals and communication signals are separated and not superposed, which results in the communication bandwidth being increased, thus speeding up the communication rate. This simplifies change in signature patterns due to the increased bandwidth increasing the signal speed of the communication signals. Hereby also thermal and visual adaptation during movement is improved.

By having current signals and communication signals separated interconnection of a large number of module elements 500 without affecting the communication speed is facilitated. Each support member 750 comprises several links 771, 772, 773, 774 for digital and/or analogue signals in combination with two or more links 761, 762 for current supply.

According to this embodiment said integrated links comprises a first link 761 and a second link 762 for supply of current to each column of module elements 500. Said integrated links further comprises third and fourth links 771, 772 for information/communication signals to the module elements 500, said signals being digital and/or analogue, and fifth and sixth links 773, 774 for information/diagnostic signals from the module elements 500, said signals being digital and/or analogue.

By having two links, third and fourth links 771, 772, for providing information signals to the module elements 500 and two links, fifth and sixth links 773, 774, for providing information signals from the module elements 500 the communication speed becomes essentially unlimited, i.e. occurs momentarily.

Figure 12F:
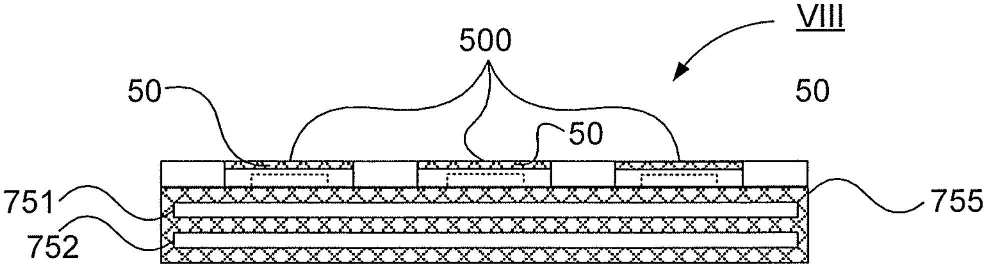
FIG. 12*f* schematically illustrates a side view of a module system comprising elements for recreating thermal and/or visual background or similar according to an embodiment of the present invention.
Figure 12G:
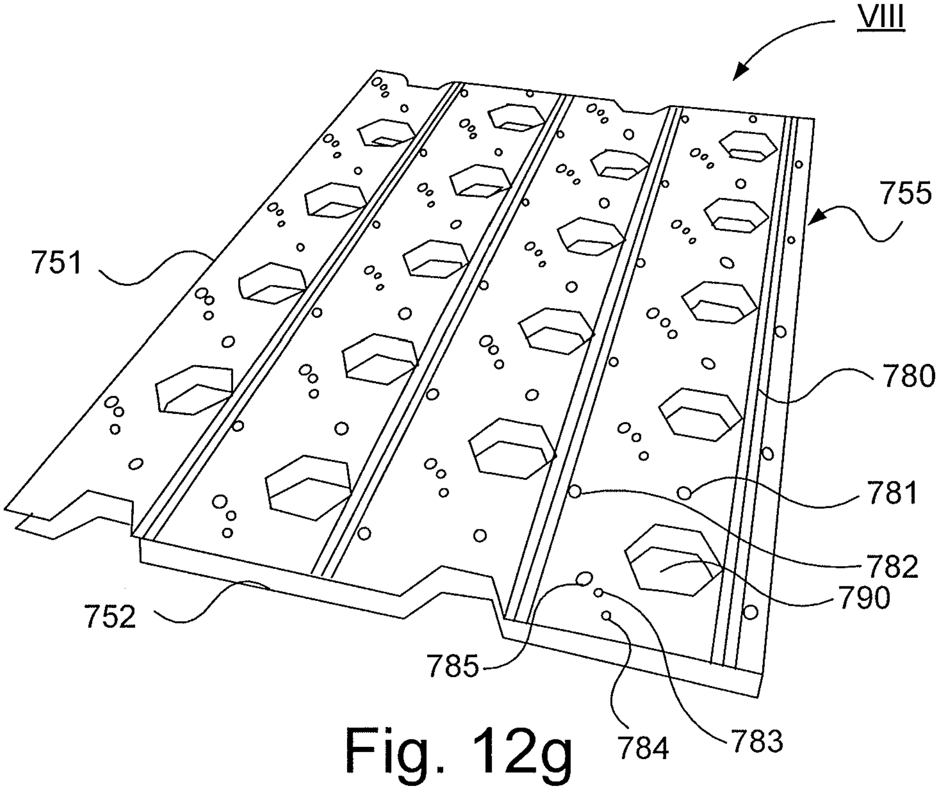
FIG. 12*g* schematically illustrates an exploded three dimensional view the module system in FIG. 12*f;*

FIG. 12*f* schematically illustrates a plan view of a module system VIII or part of a module system VIII comprising surface elements for signature adaptation according to an embodiment of the present invention, and FIG. 12*g* schematically illustrates an exploded three dimensional view of the module system VIII in FIG. 12*f*.

The module system VIII according to this embodiment differs from the module element 750 according to the embodiment illustrated in FIG. 12*d-e* in that instead of that the support structure is provided by a support structure 750, the support structure 755 is constituted by one or more support elements 755 or support plates 755, wherein each support element comprises two electrically conducting planes arranged to provide current supply to interconnected module elements 500.

According to this embodiment the support element 755 comprises two joined electrically conducting planes 751-752, wherein said two electrically conducting planes are isolated from each other. Said two electrically conducting planes 751-752 are arranged to provide power supply to said module element 500.

A first 751 of said two electrically isolated planes is arranged to be applied with a negative voltage and a second 752 of said electrically isolated planes is arranged to be applied with a positive voltage, whereby power supply to module elements 500 connected to the support element 755 is enabled without using links dedicated to power supply. The support element 755 may thereby be constructed using a reduced number of links and therefore also becomes more robust since power supply independent on individual links.

According to this embodiment the module system comprises a support element 755 and eighteen fastening points for interconnection of hexagonal module elements arranged on top of support element 755 in such a way that a left column of five module elements 500, two intermediate columns of four and five module elements 500 and a right column of five module elements 500 is formed.

By applying each of the two electric planes 751-752 with a layer or surface coating, such as for example an electrically isolating paint, it is facilitated that the two electrically conducting planes 751-752 becomes mutually isolated.

The support element 755 comprises a plurality of integrated links 780, wherein each integrated link comprises a plurality of links for information/diagnostic/communication signals of digital/analogue type to and from connected module elements 500. Each of said plurality of links is arranged to provide communication to and from a column of module elements 500. Said plurality of integrated links may be constituted by thin film, wherein said thin film is arranged at the support element 755.

The support element 755 comprises a plurality of recesses 781-785 arranged to provide fastening points and electrical contact surfaces for connected module elements 500. At least one of said recesses is arranged to place contact means of module element 500 in contact to said first and second electrically conducting planes.

The support element 755 comprises a plurality of recesses and/or through apertures 790 arranged to receive at least one sub structure of connected module elements 500. The support element 755 according to FIG. 12*g* comprises through holes arranged to receive heat conducting element 160, such as exemplified with reference to FIG. 4*a* or 5*a-b*, of hexagonal shape to enable heat transport to underlying structures and to reduce thickness of the module system.

According to an embodiment the support element 755 has a thickness in the range of 1-30 mm, e.g. 2-10 mm. According to an embodiment each of the joined electrically conducting planes 751-752 has a thickness in the range of 1-5 mm, e.g. 1 mm.

According to an embodiment the support element 755 comprises a underlying heat conducting element (not shown), arranged on the underside of the support element 755. Thereby is enabled a configuration of a module element 500 without the second heat conducting layer 120, whose function taken over by said underlying heat conducting element. By providing the underlying heat conducting element arranged on the support element 755 the heat conductibility is improved since a larger heat conducting surface, i.e. a surface corresponding to the dimension of the support element 755 is made available for respective module elements.

Support element according to FIG. 12*d* or FIG. 12*f* are connectable to other support elements of these types, wherein the support elements are interconnected via attachment points (not shown), for example via attachment points, according to FIG. 11*a*, for electric connection of the support elements via the links. Whereby the number of connection points are minimized.

Module elements 500 are connected to support elements, for example according FIG. 12*d* or FIG. 12*f*, by the use of a suitable fastening means.

Interconnected support elements, such as for example according to FIG. 12*d* or FIG. 12*f*, forming a support structure are intended to be arranged on a structure of a craft such as for example a vehicle, a ship or similar.

Figure 13:
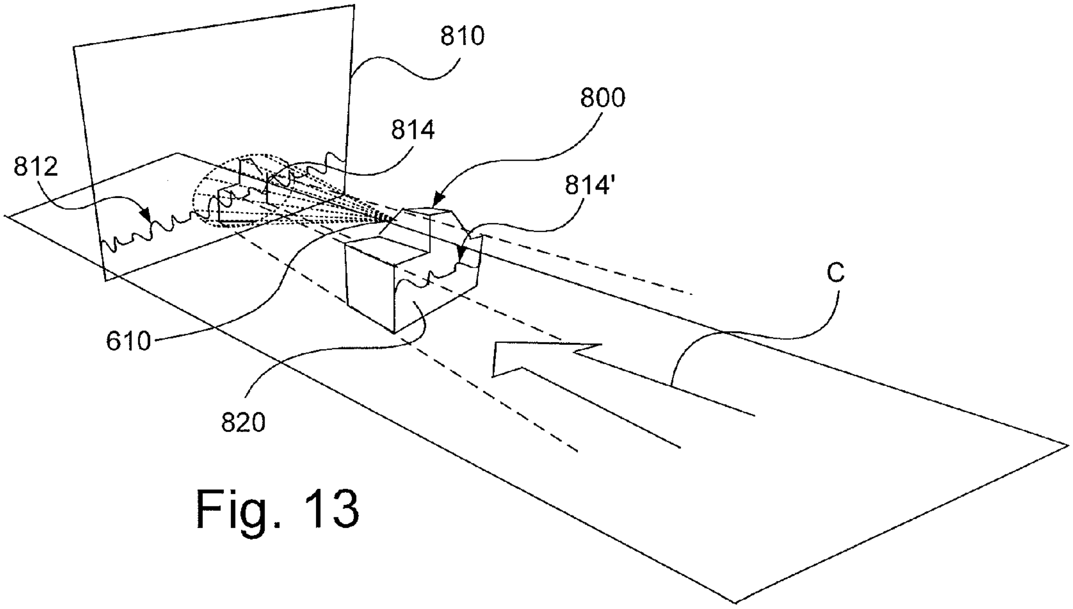
FIG. 13 schematically illustrates an object such as a vehicle subjected to a threat in a direction of threat, the background of the thermal and/or visual structure being recreated on the side of the vehicle facing in the direction of threat.

FIG. 13 schematically illustrates an object 800 such as a vehicle 800 subjected to threat in a direction of threat, the visual structure and thermal structure 812 of the background 810 being recreated on the side of the vehicle facing the direction of threat by means of a device according to the present invention. The device according to an embodiment comprises the module system according to FIG. 12*a-c*, the module system being arranged on the vehicle 800.

The estimated direction of threat is illustrated by means of the arrow C. The object 800, e.g. a vehicle 800, constitute a target. The threat may e.g. be constituted by a thermal/visual/radar reconnaissance and surveillance system, a heat seeking missile or the corresponding arranged to lock on the target.

Seen in the direction of threat a thermal and/or visual background 810 is present in the extension of the direction C of threat. The part 814 of this thermal and/or visual background 810 of the vehicle 800 being viewed from the threat is arranged to be copied by means of a thermal sensing means 610 and/or the visual sensing means 615 according to the invention such that a copy 814' of that part of the thermal and/or visual background, according to a variant the thermal and/or visual structure 814', is viewed by the threat. As described in connection to FIG. 11 the thermal sensing means 610 according to a variant comprises an IR-camera, according to a variant an IR-sensor and a variant a temperature sensor, where IR-camera provides the best thermal representation of the background. As described in connection to FIG. 11 the visual sensing means 615 according to a variant comprises a video camera.

The thermal and/or visual background 814', thermal and/or visual structure of the background sensed/copied by means of the thermal sensing means, is arranged to be interactively recreated on the side of the target, here vehicle 800, facing the threat, by means of the device, such that the vehicle 800 thermally melt into the background. Hereby the possibility for detection and identification from threats, e.g. in the form of binoculars/image intensifiers/cameras/IR-cameras or a heat seeking missile locking at the target/vehicle 800 is rendered more difficult since it thermally and visually blends into the background.

As the vehicle moves the copied thermal structure 814' of the background will continuously be adapted to changes in the thermal background due to the combination of heat conducting layers with anisotropic heat conductibility, insulation layer, thermoelectric element and continuously registered difference between thermal sensing means for sensing of thermal background and temperature sensing means according to any of the embodiments of the device according to the present invention.

As the vehicle moves the copied visual structure 814' of the background will continuously be adapted to changes in the visual structure of the background due to the combination of a display surface and visual sensing means for registering visual structure according to any of the embodiments of the device according to the present invention.

The device according to the present invention consequently facilitates automatic thermal and visual adaptation and lower contrast to temperature varying and visual backgrounds, which renders detection, identification and recognition more difficult and reduces threat from potential target seekers or corresponding.

The device according to the present invention facilitates a small radar cross section (RCS) of a vehicle i.e. an adaptation of radar signature by means of utilizing frequency selective and radar suppressive functionality. Where said adaptation can be maintained both when a vehicle is stationary and during motion.

The device according to the present invention facilitates a low signature of a vehicle, i.e. low contrast, such that the contours of the vehicle, placement of exhaust outlet, placement and size of outlet of cooling air, track stand or wheels, canon, etc., i.e. the signature of the vehicle may be thermally and visually minimized such that a lower thermal and visual signature against a background is provided by means of the device according to the present invention.

The device according to the present invention with a module system according to e.g. FIG. 12*a-c* offers an efficient layer of thermal isolation, which lowers the power consumption of e.g. AC-systems with lower affection of solar heating, i.e. when the device is not active the module system provides a good thermal isolation to solar heating of the vehicle and thereby improves the internal climate.

Figure 14:
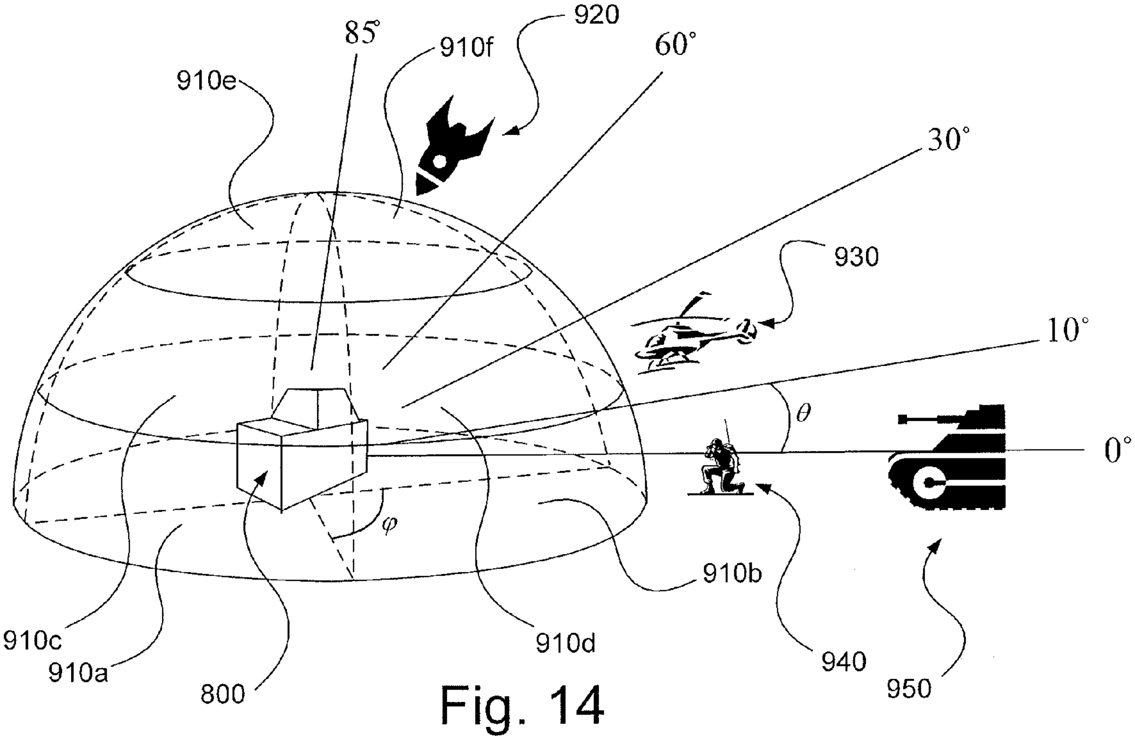
FIG. 14 schematically illustrating different potential directions of threat for an object such as a vehicle equipped with a device for recreating of the thermal and/or visual structure of a desired background.

FIG. 14 schematically illustrates different potential directions of threat for an object 800 such as a vehicle 800 equipped with a device according to an embodiment of the invention for recreation of the thermal and visual structure of desired background and for maintaining a low radar cross section.

According to an embodiment of the device according to the invention the device comprises means for selecting different direction of threats. The means according to an embodiment comprises a user interface e.g. as described in connection to FIG. 11. Depending on the expected direction of threat, the IR-signature and the visual signature will need to be adapted to different backgrounds. The user interface 630 in FIG. 11 according to an embodiment constitute graphically a way for the user to easily be able to select from an estimated direction of threat which part or parts of the vehicle that needs/need to be active in order to keep a low signature to the background.

By means of the user interface the operator may choose to focus available power of the device to achieve the best conceivable thermal/visual structure/signature, which e.g. may be required when the background is complicated and demanding much power of the device for an optimal thermal and visual adaptation.

FIG. 14 shows different directions of threat for the object 800/vehicle 800, the directions of threat being illustrated by having the object/vehicle drawn in a semi-sphere divided into sections. The threat may be constituted by e.g. threat from above such as target seeking missile 920, helicopter 930, or the like or from the ground such as from soldier 940, tank 950 or the like. If the threat comes from above the temperature of the vehicle and the visual structure should coincide with the temperature and visual structure of the ground, while it should be adapted to the background behind the vehicle should the threat be coming straight from the front in horizontal level. According to a variant of the invention a number of threat sectors 910*a-f* defined, e.g. twelve threat sectors, of which six 910*a-f* are referred to in FIG. 14 and an additional six are opposite of the semi-sphere, which may be selected by means of the user interface.

Above the device according to the present invention has been described where the device is utilized for adaptive thermal and visual camouflaging such that e.g. a vehicle during movement continuously by means of the device according to the invention quickly adapts itself thermally and visually to the background, the thermal structure of the background being copied by means of a thermal sensing means such as an IR-camera or an IR-sensor and the visual structure of the background being copied by means of a visual sensing means such as an camera/video camera.

The device according to the present invention may advantageously be used for generating directionally dependent visual structure for example by means of utilizing a display surface according to FIG. 7*d-e*, i.e. using a display surface that is capable of generating a reproduction of the visual structure of the background that is representative of the background observed from different observation angles, that falls outside an observation angle that is substantially orthogonal to the respective display surface of the module elements. As an example the device may reproduce a first visual structure that is representative of the background seen from a first observation angle, formed between a position of the helicopter 930 and a position of the vehicle 800 and a second visual structure that is representative of the background viewed from an observation angle, formed between a position of a soldier 940 or tank and a position of the vehicle 950. This enables to reproduce background structure more life-like from correct perspectives viewed from different observation angles.

The device according to the present invention may advantageously be used for generating specific thermal and/or visual patterns. This is achieved according to a variant by regulating each thermoelectric element and/or at least one display surface of a module system built up of module elements e.g. as illustrated in FIG. 12*a-c* such that the module elements receives desired, e.g. different, temperature and/or radiates desired spectrum, any desired thermal and/or visual pattern may be provided. Hereby for example a pattern which only may be recognized by the one knowing its appearance may be provided such that in a war situation identification of own vehicles or corresponding is facilitated while the enemy are unable to identify the vehicle. Alternatively a pattern known by anyone may be provided by means of the device according to the invention, such as a cross so that everybody may identify an ambulance vehicle in the dark. Said specific pattern may for example be constituted by a unique fractal pattern. Said specific pattern may further be super positioned in the pattern that is desired to be generated for purpose of signature adaptation so that said specific pattern only is made visible for units of own forces that are provided with sensor means/decoding means.

By using the device according to the present invention to generate specific patterns efficient IFF system functionality ("Identification-Friend-or-Foe") is facilitated. Information relating to specific patterns may for example be stored in storage units associated to firing units of own forces so that sensor means/decoding means of said firing units perceives and decodes/identifies objects applied with said specific patterns and thereby are enabled to generate information that prevents firing.

According to yet another variant the device according to the present invention may be used for generating a fake signature of other vehicles for e.g. infiltration of the enemy. This is achieved by regulating each thermoelectric element and/or at least one display surface of a module system built up of module elements e.g. as illustrated in FIG. 12*a-c* such that the right contours of a vehicle, visual structures, evenly heated surfaces, cooling air outlet or other types of hot areas being unique for the vehicle in question are provided. Hereby information regarding this appearance is required.

According to yet a variant the device according to the present invention may be used for remote communication. This is achieved by that said specific patterns are associated to specific information that may be decoded using access to a decoding table/decoding means. This facilitates "silent" communication of information between units wherein radio waves that may be intercepted by opposing forces are rendered un-necessary for communication. For example status information relating to one or more of the following entities fuel supply, position of own forces, position of opposing forces, ammunition supply, etc. may be communicated.

Further, thermal patterns in the form of e.g. a collection of stones, grass and stone, different types of forest, city environment (edgy and straight transitions) could be provided by means of the device according to the invention, which patterns could look like patterns being in the visible area. Such thermal patterns are independent of direction of threat and are relatively cheap and simple to integrate.

For the above mentioned integration of specific patterns according to a variant no thermal sensing means and/or visual sensing means is required, but is sufficient to regulate the thermoelectric elements and/or said display surfaces, i.e. apply voltage corresponding to desired temperature/spectrum for desired thermal/visual pattern of respective module.

By means of using the efficient signature adaptation a number of application areas are enabled for a device according to the present invention. As an example the device according to the present invention may advantageously be used in for example articles of clothing, such as for example protection vests or uniforms, where a device according to the invention efficiently could hide the heat and visual structure that is generated by a human body, wherein power supply preferably is arranged by means of a battery and wherein desired thermal and/or visual camouflage is performed in dependence of data from a data base descriptive of objects/environments and/or data from one or more sensors (IR, camera) such as for example helmet cameras.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A device for thermal and radar signature adaptations, comprising:

at least one surface element that comprises at least one temperature generating element and at least one radar suppressing element, wherein said at least one surface element is arranged to assume a determined thermal distribution, said at least one temperature generating element is arranged to generate at least one predetermined temperature gradient to a portion of said at least one surface element, and said at least one radar suppressing element is arranged to absorb incident radio waves so as to suppress reflections of the incident radio waves.

2. Device according to claim 1, wherein said at least one temperature generating element is thermally applied to a subsurface area of a portion of said at least one surface element for generation of said at least one temperature gradient to said portion.

3. Device according to claim 2, wherein said portion constitutes at least one outer layer of said at least one surface element.

4. Device according to claim 3, wherein said at least one outer layer is arranged to provide a frequency selective subsurface area, wherein said frequency selective subsurface area is arranged to pass through radio waves within a predetermined frequency range and wherein said frequency selective subsurface area has heat conducting properties.

5. Device according to claim 4, wherein said frequency selective subsurface area is arranged to surround said subsurface area of said portion.

6. Device according to claim 5, wherein said frequency selective subsurface area and said subsurface area to which said at least one temperature generating element is thermally applied are mutually arranged so that the permeability for radio waves substantially does not decrease the heat conductibility of said portion.

7. Device according to claim 1, wherein said at least one surface element comprises at least one display surface that has thermal permeability and is arranged to radiate at least one predetermined spectrum.

8. Device according claim 7, wherein said at least one display surface is arranged to permit said at least one predetermined temperature gradient to be maintained in said at least one surface element.

9. Device according to claim 7, wherein said at least one display surface is of emitting type.

10. Device according to claim 7, wherein said at least one display surface is of reflecting type.

11. Device according to claim 7, wherein said at least one display surface is arranged to radiate at least one predetermined spectrum that comprises at least one component within the frequency range of visual electromagnetic waves and at least one component within the frequency range of infrared electromagnetic waves.

12. Device according to claim 7, wherein said at least one display surface is arranged to radiate at least one spectrum in a plurality of directions, wherein said at least one predetermined spectrum is directionally dependent.

13. Device according to claim 12, wherein said at least one display surface comprises a plurality of display subsurfaces, wherein said display subsurfaces are arranged to radiate at least one predetermined spectrum in at least one predetermined direction, wherein said at least one predetermined direction for each display subsurface is individually displaced relative an orthogonal axis of said display surface.

14. Device according to claim 12, wherein said at least one display surface comprises an obstructing layer arranged to obstruct incident light and an underlying curved reflecting layer arranged to reflect incident light.

15. Device according to claim 1, wherein the device comprises at least one additional element arranged to provide armouring.

16. Device according to claim 1, wherein the device comprises a framework or support structure, wherein the framework or support structure is arranged to supply current and control signals or to supply current and communication.

17. Device according to claim 1, wherein the device comprises a first heat conducting layer, a second heat conducting layer, said first and second heat conducting layer being mutually thermally isolated by means of an intermediate insulation layer, wherein at least one thermoelectric element is arranged to generate said predetermined temperature gradient to a portion of said first heat conducting layer and wherein said first layer and said second layer have anisotropic heat conduction such that heat conduction mainly occurs in the main direction of propagation of the respective layer.

18. Device according to claim 17, wherein the device comprises an intermediate heat conducting element arranged in the insulation layer between the thermoelectric element and the second heat conducting layer, and has anisotropic heat conduction such that heat conduction mainly occurs crosswise to the main direction of propagation of the second heat conducting layer.

19. Device according to claim 1, wherein said at least one surface element has a hexagonal shape.

20. Device according to claim 1, further comprising visual sensing means arranged to sense the visual background of the surrounding.

21. Device according to claim 1, further comprising thermal sensing means arranged to sense surrounding temperature.

22. Device according to claim 1, wherein the surface element has a thickness in the range of 5-60 mm throughout the surface element.

23. A vehicle, comprising:

a wheel; and a device for thermal and radar signature adaptations, wherein said device comprises at least one surface element and said at least one surface element comprises at least one temperature generating element and at least one radar suppressing element, wherein said at least one surface element is arranged to assume a determined thermal distribution, said at least one temperature generating element is arranged to generate at least one predetermined temperature gradient to a portion of said at least one surface element, and said at least one radar suppressing element is arranged to absorb incident radio waves so as to suppress reflections of the incident radio waves.

* * * * *